(12) United States Patent
Samuels

(10) Patent No.: US 8,520,674 B2
(45) Date of Patent: Aug. 27, 2013

(54) CAMPUS AUDIO-VISUAL CONTROL AND COMMUNICATION SYSTEM

(75) Inventor: Sheldon M. Samuels, Plano, TX (US)

(73) Assignee: AMX, LLC, Richardson, TX (US)

( * ) Notice: Subject to any disclaimer, the term of this patent is extended or adjusted under 35 U.S.C. 154(b) by 1386 days.

(21) Appl. No.: 12/147,406

(22) Filed: Jun. 26, 2008

(65) Prior Publication Data

US 2009/0313659 A1     Dec. 17, 2009

Related U.S. Application Data

(60) Provisional application No. 61/073,336, filed on Jun. 17, 2008.

(51) Int. Cl.
*H04L 12/66*     (2006.01)
*H04L 12/28*     (2006.01)
*H04L 12/56*     (2006.01)

(52) U.S. Cl.
USPC ......................................... 370/390

(58) Field of Classification Search
None
See application file for complete search history.

(56) References Cited

U.S. PATENT DOCUMENTS

| | | | | |
|---|---|---|---|---|
| 5,613,128 | A | * | 3/1997 | Nizar et al. ............... 710/266 |
| 6,748,278 | B1 | * | 6/2004 | Maymudes ................ 700/17 |
| 2005/0015805 | A1 | * | 1/2005 | Iwamura .................... 725/79 |
| 2008/0134266 | A1 | * | 6/2008 | Kang ......................... 725/110 |

OTHER PUBLICATIONS

A. Johonson, R. Sparks, RFC 4317: Session Description Protocol (SDP) Offer/Answer Examples, pp. 1-25, Dec. 2005.*

* cited by examiner

*Primary Examiner* — John Blanton
*Assistant Examiner* — Christopher Crutchfield
(74) *Attorney, Agent, or Firm* — Gardere Wynne Sewell LLP

(57) ABSTRACT

A method and system for distributing audio, visual, data, annunciator and other information within an educational facility utilizes a bit-wise addressing scheme to route UDP message packets to individual classrooms. The audio/video network system includes a central processor that controls a plurality of audio/video sources (e.g., DVD players, cable TV receivers, etc.). Output from audio/video sources is encoded by audio/video encoders for transmission via a local area network. Classroom control hubs within each classroom recognize data packets addressed with the bit-wise addressing scheme and in combination with a video decoder, recover the encoded audio/video signal for presentation within the classroom, such as by a video projector and classroom speakers. Transmitting audio/video information in UDP packets addressed with the bit-wise addressing scheme enables near simultaneous presentation of audio and video programs throughout the educational facility. The system can also manage traditional school bells and public address functions.

9 Claims, 14 Drawing Sheets video-broadcast

CAMPUS AUDIO-VISUAL CONTROL AND COMMUNICATION SYSTEM

RELATED APPLICATIONS

The present application claims the benefit of priority to U.S. Provisional Patent Application No. 61/073,336 filed Jun. 17, 2008 entitled "Campus Audio-Visual Control and Communication System," the entire contents of which are hereby incorporated by reference.

FIELD OF INVENTION

This invention generally relates to methods and systems for controlling audio, visual and other services within a building, and more particularly to methods and systems for managing audio, visual, and announcements within a school.

BACKGROUND

Modern schools utilize a wide variety of audio and visual devices and sources for educating students, making announcements and otherwise organizing the daily operations within a school facility. Traditionally, audio systems, visual systems (e.g., televisions), computer systems, bells and annunciators have been deployed as separate, stand alone systems.

SUMMARY

The various embodiments provide methods and systems for managing a variety of audio, visual, information and annunciator systems within an integrated enterprise system Embodiment systems and methods used a bit-wise addressing scheme to route UDP message packets to individual classrooms. In an embodiment the audio/video network system includes a central processor that controls a plurality of audio/video sources (e.g., DVD players, cable TV receivers, etc.). Output from audio/video sources is encoded by audio/video encoders for transmission via a local area network. Classroom control hubs within each classroom recognize message data packets addressed with the bit-wise addressing scheme and in combination with a video decoder, recover the encoded audio/video signal for presentation within the classroom, such as by a video projector and/or classroom speakers. Transmitting audio/video information in UDP packets addressed with the bit-wise addressing scheme enables near simultaneous presentation of audio and video programs throughout the educational facility. The system can also manage traditional school bells and public address functions.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
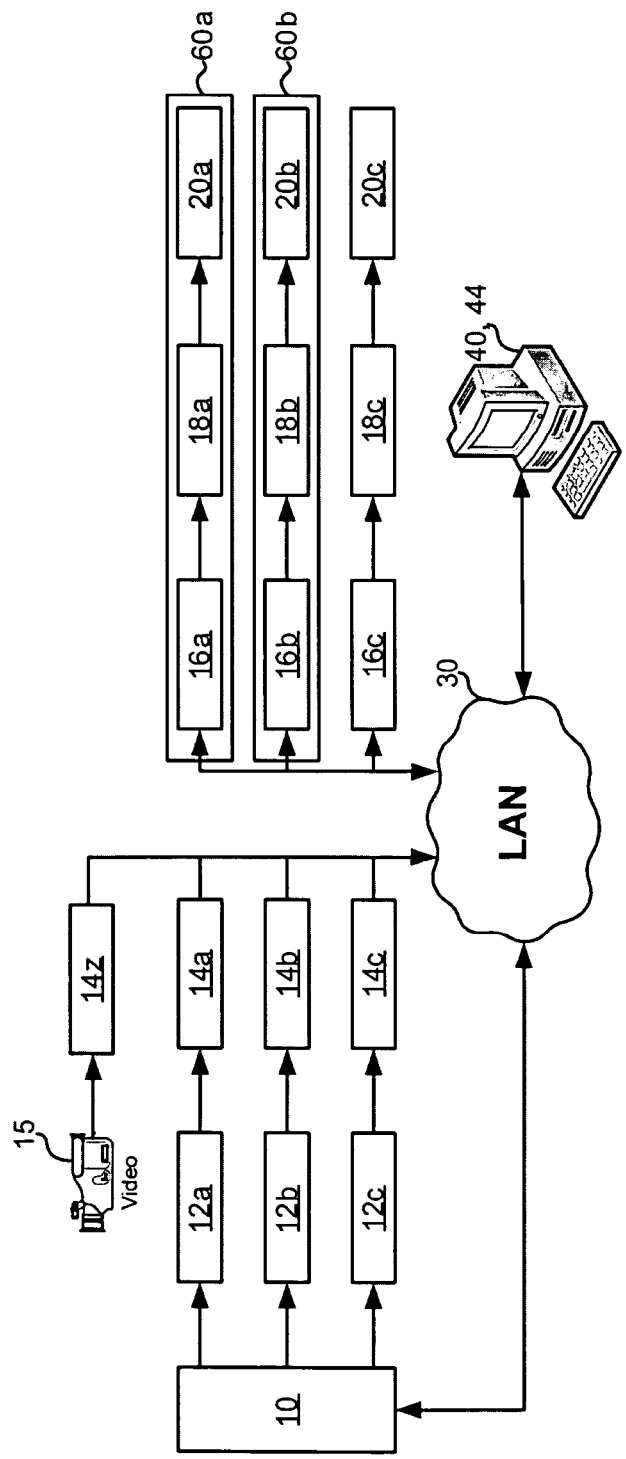
FIG. 1 is a network system block diagram of an audio/video network system according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "exemplary" is used herein to mean "serving as an example, instance, or illustration." Any implementation described herein as "exemplary" is not necessarily to be construed as preferred or advantageous over other implementations.

Twenty-first century schools use technology to drive efficiency, safety and improved teaching and learning. While the past decade has seen dramatic changes in education technology both inside and outside the classroom, each advancement has typically brought with it a new system, new procedures and new challenges. Central audio systems, such as public address (PA) systems and centralized music distribution, were typically installed in school campuses without regard to preexisting bells or alarm systems. Similarly, when video systems, such as closed circuit television and VCRs, were added to classrooms, they were typically added as stand alone systems and modules. More recently computer networks with access to the Internet have been added to school facilities as teachers and administrators adapt to the "information age." As a result, well equipped schools find themselves managing a random mix of disconnected audio, visual, annunciator and information systems.

The various embodiments seek to resolve this problem by providing a complete, scalable integrated solution that consolidates management and control of diverse school technologies at the district, building and classroom level, on a single, comprehensive platform. The various embodiments employ a unique network-based solution to modernize traditional bell, clock and PA systems as well as manage and control classroom audio, video and presentation tools. The various embodiments provide school administrators with the ability to create a virtually unlimited set of bell events which may be assigned to multiple, automated schedules. For example, administrators can arrange bell schedules so that early release days, test days, finals week bells and others are pre-assigned weeks or months in advance. In addition, bell events can be customized so that each bell event can be given a unique tone, can be assigned to a particular day of the week, and can be designated to any group of rooms or to the entire campus. The various embodiments link to any pre-defined network time server so that all school-wide digital clocks remain synchronized so they all display the same time with the bell schedule synchronized to the clocks. The various embodiments provide school officials with audio paging via a wall-mounted microphone, a push-to-talk microphone or any telephone extension. In each case, the audio page can be routed to a single classroom, any group of classrooms or an entire building. Any connected classroom or audio zone can be individually addressed at all times. The various embodiments support streaming video using standard DVD players, CATV tuners, satellite receivers, and/or video cameras. Administrators and teachers can use video broadcasts for sharing material between classrooms, for delivering pre-recorded or live content or even for broadcasting events such as a student performance. Content may be broadcast to designated classrooms or selected "on demand" by individual teachers using easily accessible in-class controls. The various embodiments manage delivery of multiple music sources throughout the school. Music can be simultaneously distributed from multiple sources such as compact discs (CD) disc players, MP3 players or AM/FM radio to any or all zones such as the cafeteria, gymnasium and hallways and at various times such as lunch, or before and after school. The various embodiments can interface directly with networked security cameras, providing camera control and multiple camera views on a main control panel. In addition, the various embodiments can link specific video cameras to actions and events within a building, automatically displaying live video on the control panel from the associated camera when a doorbell is pressed. Multiple camera thumbnails and a quad view of the user's choice of any four cameras can be made available directly on the control panel. The various embodiments enable digital signage that can provide visual information to faculty, students and visitors by streaming video, graphics and text to any or all video displays or projectors. For example, flat panel displays and/or televisions can display information such as the daily lunch menu, teacher of the month, outstanding student achievements, and the PTA agenda, all of which can be scheduled days, weeks, or months in advance. The various embodiments enable administrators to broadcast a pre-defined audio and/or video emergency alert or scheduled drill (Lockdown, Weather, Fire, etc.) message through speakers, projectors and displays in classrooms throughout the school.

The various embodiments take advantage of existing school data networks and of advancements in networked audio and video to streamline bell schedules, to bring networked precision to clocks and to deliver audio paging and/or streaming video to the entire school, a single room or anywhere in between. Although an embodiment of the system is not a substitute for a school's video security system, the embodiments can provide an additional access point for viewing existing networked video security cameras from a convenient control panel which may be installed, for example, in the school's main office or accessed via any authorized web browser.

The various embodiments can provide monitoring and intuitive control of classroom multimedia devices, such as projectors, audio amplifiers, DVD players, CATV tuners, document cameras and similar multimedia devices. An embodiment can provide management and control of streaming video which can be sent directly from the school or district media center to the classroom video projector.

The various embodiments can continuously monitor local systems and devices, triggering alarms when an "exception" is detected. Common exceptions range from projectors being disconnected to a classroom "panic button" being pressed. When an alarm is triggered, an embodiment system can notify school administers using multiple communication mechanisms, including audible alarms, visual alerts displayed on a central control panel and on other displays throughout the school facility, and e-mail messages identifying the alarm condition and the event location.

The various embodiments enable setup and management via a secure browser interface to the control panel from a computer, such as a personal computer coupled to the network. In an embodiment, a graphical user interface is provided which shows the floor plan of the school campus and enables controlling audio/visual devices, such as audio paging zones, by selecting particular rooms or zones on a graphical floor plan display such as by using a pointing device or touch-screen interface.

The various embodiments include a communication system architecture suitable for use in a variety of school facilities designed to be compatible with a wide range of commercially available information sources and network component. In order to achieve the desired network performance, communication via the local area network implements improvements over conventional network architectures. The following description provides an overview of the overall system architecture, followed by descriptions of key system components, followed by descriptions of the network communication innovations that enabled the system to function as required to meet the needs of the typical school.

An overview of the network system according to an embodiment is illustrated in FIG. 1. A central processor 10 located in or near a system head-end provides control commands to a plurality of information sources 12a-12c, such as DVD players, television receivers, CD players, and other audio/video sources. The output from the information sources 12a-12c is digitally encoded by audio/video encoders 14a-14c into data packets suitable for transmission via the school's local area network 30. In addition to audio/video information sources that may be used for classroom teaching and entertainment purposes, school alarm, bells and security systems, such as video surveillance cameras 15, may also be connected to the system by encoding their output into network-compatible digital format and transmitting such information via the local area network 30. Audio/video and command data transmitted from the head-end and other school systems may be delivered to individual classrooms 60a, 60b via the local area network using a bit-wise addressing scheme described in more detail below. Data packets intended for a particular classroom 60a are received by a classroom control hub 16a which controls display equipment within a particular classroom. Encoded video signals may be recovered from the network signals by a video decoder 18a before being presented to presentation devices 20a, such as classroom projectors 22 and audio speakers 24 (shown in FIGS. 4, 5). Each classroom 60a, 60b may include similar devices, so a second classroom can receive audio/video signals via the network 30 which are addressed to its classroom control hub 16b for presentation on the classroom's display equipment 20b. Additionally, presentation of audio/video and other information may be provided in other locations outside of classrooms, with such information being received by a control hub 16c, with video components recovered from network signals via a video decoder 18c and presented on various displays and/or speakers 20c. The overall communication system is managed by the central processor 10 which can be controlled from a variety of networked computers 40, 44 with user inputs received via graphical user interfaces. Further details regarding an embodiment system are provided below with reference to FIGS. 2-7.

Figure 2:
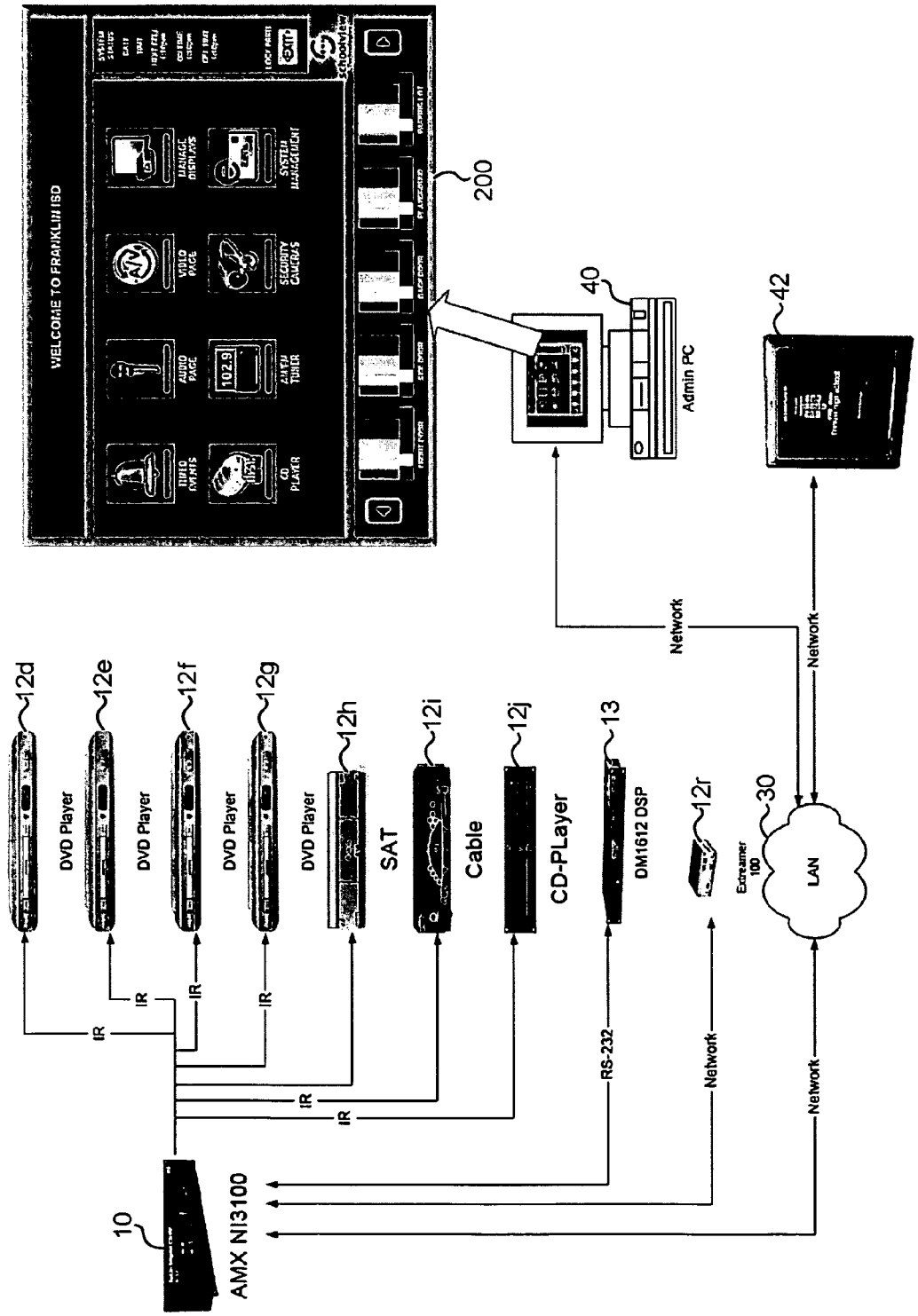
FIG. 2 is a network system block diagram showing control flows within a head end portion of an audio/video network system according to an embodiment.

FIG. 2 illustrates basic controls of the equipment located in the system's head-end rack. As mentioned above, overall system control is provided by the central processor 10. As mentioned below with reference to FIG. 8, a suitable commercially available processor that may be used as the central processor 10 is the Ni3100 NetLinx Integrated Controller sold by AMX®. The central processor 10 is configured to communicate with a plurality of audio/video equipment in the head-end, such as by means of infrared (IR) data links, in order to direct the functioning of these devices. In the example embodiment illustrated in FIG. 2, the central processor 10 is linked by IR data link to a series of DVD players 12d-12g, a satellite television receiver 12h, a cable television receiver 12i, and a compact disc (CD) player 12j. In this configuration, the central processor 10 can communicate with the source devices using the same IR command codes as implemented on the remote controllers typically provided with such commercially available audio/video devices. The central processor 10 may be configured with software instructions to include the ability to learn IR command sequences of individual audio/video source devices. The central processor 10 may also be linked to equipment, such as an audio decoder (e.g., an MP3 player) 12r, by the local area network 30, or by control cables, such as an RS-232 cable, which in the illustrated example connects to a digital signal processor 13. Additionally, the central processor is connected directly to the local area network 30 allowing it to communicate with networked computers, such as an administration computer 40. Administrators can control of the central processor 10 by interfacing with a graphical user interface 20 displayed on an administration computer 40, with control signals being communicated between the computer and the central processor 10 via the network 30.

Figure 3:
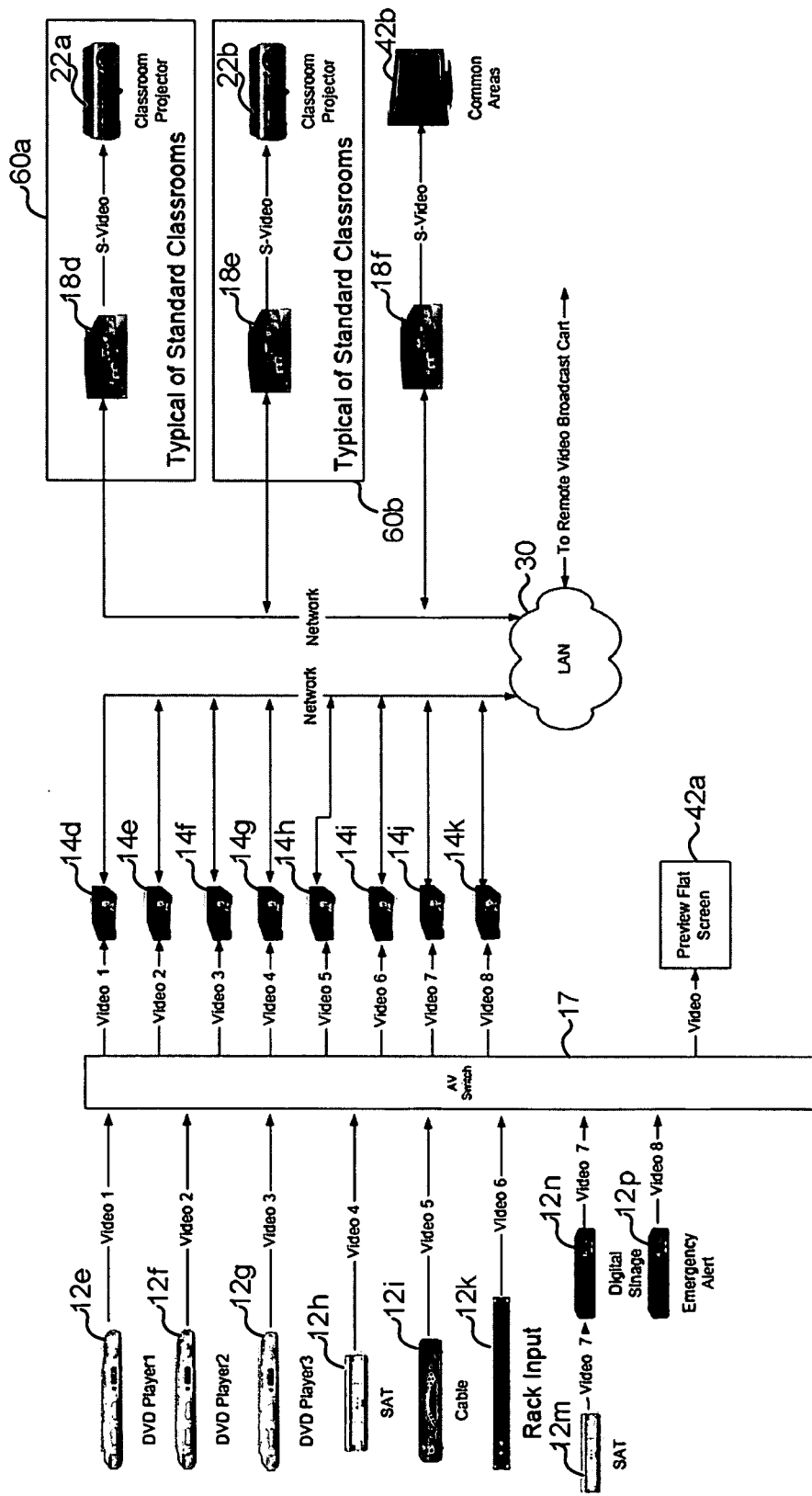
FIG. 3 is a network system block diagram showing video signal flows within an audio/video network system according to an embodiment.

The flow of video signals from the head-end through the network 30 to the various classrooms 60a, 60b is illustrated in FIG. 3. As described above, the head-end rack may include a variety of video sources, such as a series of DVD players 12e-12g, a satellite television receiver 12h, and a cable television receiver 12i. Additionally, the head-end may include a rack input 12k for connecting other video sources, a digital signage processor 12n for generating static displays on school monitors (e.g., daily announcements, etc.), and emergency alert sources 12p (e.g., video feeds from school district headquarters, emergency response agencies or alarm displays such as visual fire alarm announcements). The digital signage source 12n may also be connected to other video sources, such as another satellite TV receiver 12m. Each of the video sources is connected to a respective one of a plurality of audio/video encoders 14d-14k. Additionally, all of the video sources within the head-end may also be connected to an audio/visual preview switch 17 which can connect each video source to a head-end preview monitor 42a. The head-end preview monitor 42a coupled to the audio/video preview switch 17 may be used by technicians, administrators and teachers to view video content locally at the head-end such as to monitor video programs being provided to various classrooms and other locations. The audio/visual encoders 14d-14k convert the received video and accompanying audio signals into digital message packets which can be transmitted by the local area network 30. As described more fully below, the audio/video encoders 14d-14k broadcast the encoded video and audio data packets to all rooms. Control packets sent in parallel over the local area network 30 are transmitted from the central processor 10 using a bit-wise addressing scheme that enables addressed network devices (e.g., classroom control hubs 16) to recognize and decode messages addressed to them. Encoded video and audio data packets are broadcast across the local area network 30 and classroom control hubs 16d, 16e in classrooms 60a, 60b determine which data packets (i.e., which data stream) to process and decode. At the classroom control hubs 16d, 16e, the encoded video and audio signals are received and decoded by a video decoder 18d, 18e before being displayed on a video display or classroom projector 22a, 22b. Audio signals decoded by the video decoder 18d, 18e are routed to the classroom control hubs 16d, 16e for amplification before being applied to classroom speakers 24. Video may also be received, decoded and displayed at other locations throughout the school facility, such as by a video decoder 18f coupled to a common area video screen 42b.

Figure 4:
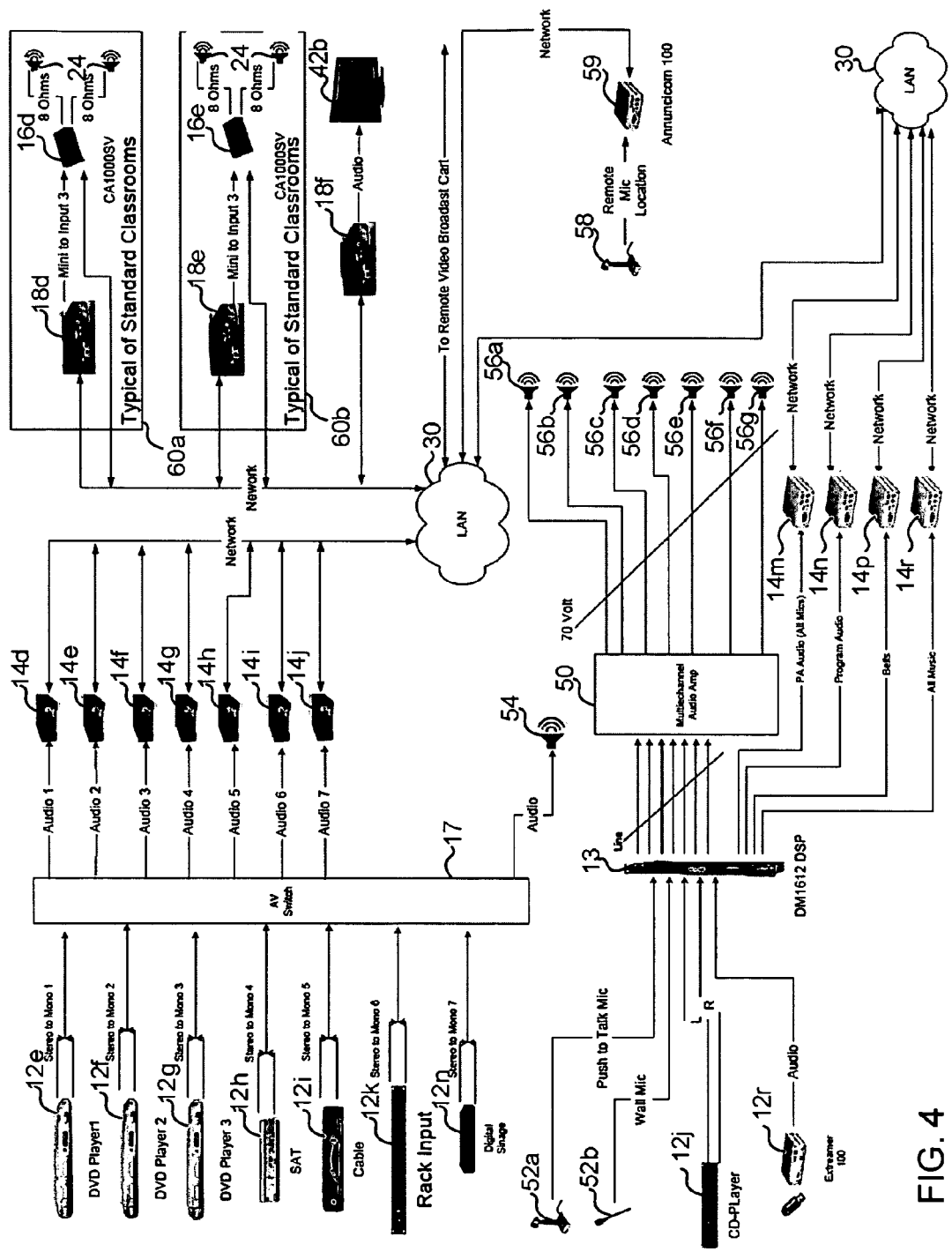
FIG. 4 is a network system block diagram showing audio signal flows within an audio/video network system according to an embodiment.

The flow of audio signals from the head-end through the network 30 to the various classrooms 60a, 60b is illustrated in FIG. 4. As described above, the head-end rack may include a variety of audio/video sources, such as a series of DVD players 12e-12g, satellite television receivers 12h, and cable television receivers 12i which provide an audio output that is connected to the audio/visual encoders 14d-14k along with the video outputs as described above. The head-end rack may also include a variety of pure audio sources, such as a CD player 12j, and a digital audio decoder 12r (e.g., an MP3 player). Additionally, the head-end may include a rack input 12k for connecting other audio and/or video sources, such as a digital signage generator 12n for generating static displays on school monitors including an audio stream (e.g., daily announcements, etc.). The audio output from audio/visual sources (e.g., DVD players 12e-12g, satellite television receivers 12h, and cable television receivers 12i) are processed along with the video signals in the head-end portion of the system as described above, namely being encoded by audio/visual encoders 14d-14k into digital message packets and transmitted by the local area network 30. The pure audio sources may be connected to an audio digital signal processor 13, such as a Lectrosonics DM1612 mixer, for processing and mixing. Output from the audio digital signal processor 13 may be amplified by a multichannel audio amplifier 50 and provided to speakers in common zones, such as hallways and administration offices. Additionally, output from the audio digital signal processor 13 may be provided to a plurality of audio encoders 14m-14r which convert the received audio signals into digital data packets which can be transmitted via the local area network 30. In an embodiment, the audio encoders 14m-14r may be assigned based upon their functionality, not their availability. For example, the example implementation illustrated in FIG. 4 uses the first encoder 14m for all high priority audio events (e.g., wall-microphone 52b or push-to-talk microphone 52a), uses a second audio encoder 14n for program audio (e.g. from the remote broadcast cart), uses a third encoder for bell tone audio, and uses a fourth encoder 14r for background music (lowest-priority). As described below, the audio/video encoders 14d-14j and audio encoders 14m-14r may be configured to broadcast the audio data packets across the local area network so that classroom control hubs 16d, 16e can determine whether to decode an audio stream and, if so, which stream to process. As mentioned above, the classroom control hubs 16d, 16e also receive broadcast command packets which are addressed using a bit-wise addressing scheme described below to ensure that each audio stream arrives at the intended destination.

Additionally, pure audio sources can be monitored at the head-end by routing the audio source to a zone referenced as the "Monitor" speaker zone.

In addition to the head-end audio/video sources, the various embodiments can also integrate existing audio announcing systems including public address, bells and annunciators, and background music systems. Alternatively, the various embodiments can include a bell tone generator, such as the digital audio decoder 12r (e.g., an MP3 player), which retrieves all of the bell tones from memory, such as a USB memory device (i.e., "thumb drive") connected to a USB slot in the decoder 12r. Such generated bell tone audio output from the digital audio decoder 12r passes through the digital signal processor 13 and the audio amplifier 50 before being played on the zone speakers 56a-56g. Microphones, such as a push to talk microphone 52a as may be positioned within the school administration offices, and wall-mounted microphones 52b may be connected to the digital signal processor 13 positioned within or near the head-end equipment prior to or in parallel to a multichannel audio amplifier 50 coupled to the school's common area loudspeakers 56a-56g. Digitally encoded sound from the microphones 52a, 52b may be further encoded for network transmission by an audio encoder 14m before being coupled to the local area network 30. By connecting to public address microphones 52a, 52b the embodiment systems can extend pre-existing public address systems to provide audio output to all of speakers supported by the audio/video network system. In a similar manner, remote microphones 58 may be coupled to the audio/video network system by digitizing and encoding the audio information, such as in an encoder 59 coupled to the local area network 30. Similarly, the school's bell system can be connected to the audio/video network system by routing digital bell signals from a DSP 13 to an audio encoder 14p which applies the audio encoded message packets to the local area network 30 addressed to all classrooms and sounds intended for bell signals. In a similar way, existing program audio and background music systems can be routed through the audio/video network system by digitizing the source audio in a digital signal processor 13 and encoding the digital data into network data packets in audio encoders 14n, 14r.

Figure 9:
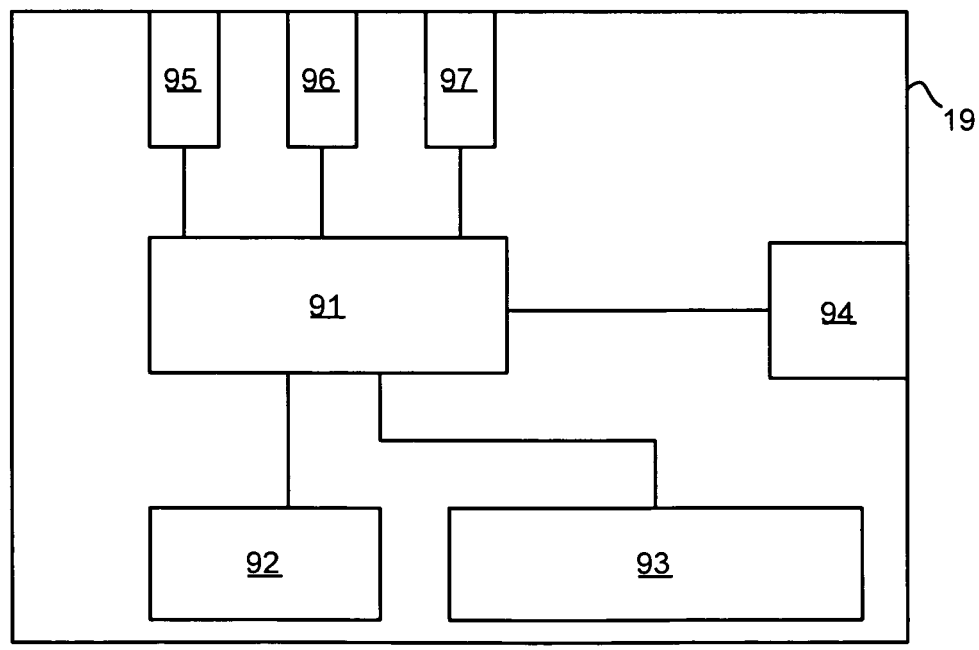
FIG. 9 is a circuit block diagram of a local device controller suitable for use on an audio/video network system according to an embodiment.

Encoded audio data packets travel via the local area network 30 to their addressed destination, such as classrooms 60a, 60b. There, the encoded audio is received and decoded by the classroom control hub 16d, 16e (see also FIG. 5), before being turned into sound by classroom speakers 24. Audio may also be received, decoded and displayed at other locations throughout the school facility, such as by an audio decoder coupled to speakers associated with a common area video screen 42b. Common area video displays will also require a classroom control hub 16 (e.g., a CA1000SV) as described below with reference to FIG. 10 to decode audio streams. Also, a local device controller 19 (e.g., an ION-LT2) described below with reference to FIG. 9 is required to enable system software to control the video display.

Figure 5:
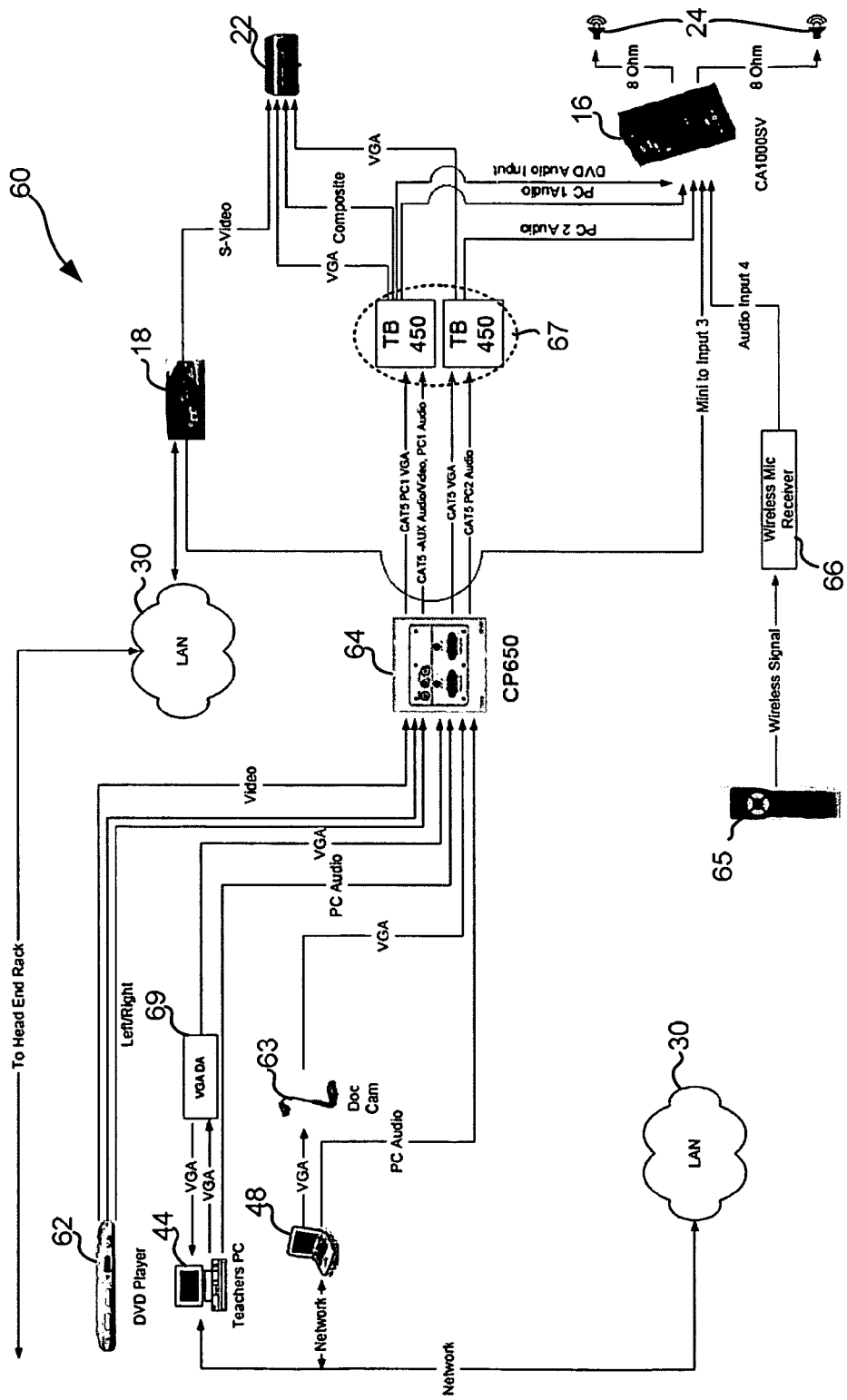
FIG. 5 is a network system block diagram showing audio and video signal flows within a classroom portion of an audio/video network system according to an embodiment.

The flow of audio and video signals within a typical classroom 60 is illustrated in FIG. 5. As described above, audio and video information is relayed to classrooms via the school's local area network 30. There, audio/video data packets intended for the particular classroom 60 are recognized based upon their addresses as described more fully below. Video data packets are received and decoded by a video decoder 18 to generate an analog video feed that is connected by a cable to a classroom projector 22 (or television or video monitor) such as in S-video format. An example of a suitable commercially available audio/video decoder is the AmiNET110H manufactured by Amino (www.aminocom.com). Audio information decoded from the video data packets may be sent to the classroom control hub 16 where the signals are amplified before being applied to the classroom speakers 24. The classroom suite of audio/video equipment and computers may also be connected to the classroom projector 22 and speakers 24. For example, a classroom DVD player 62 may be coupled by video cables to the classroom projector 22, such as by plugging the output cables from the DVD player 62 into a cable connector wall plate 64 connected to an audio/video breakout circuit 67 which connects to the projector 22 and to the class room control hub 16. An example of a suitable cable connector wall plate 64 is the CP650 and an example of the breakout circuit 67 is the TB450 both manufactured by Calypso Control Systems, Inc. Audio from the DVD player 62 is routed by built-in audio cables to the classroom control hub 16 for amplification of the audio portion for presentation on room's speakers 24. Similarly, audio and video streams generated by personal computers may be connected into the room's audio/visual system by plugging audio and video leads from the computers 44, 48 into the cable connector wall plate 64. Similarly, a document camera 63 may also be connected into the system by plugging the video lead from the camera into the cable connector wall plate 64. Finally, microphones, such as a wireless microphone 65, may be connected to the classroom audio/visual network system by being received by a wireless microphone receiver 66 coupled to or built into the classroom control hub 16 (see FIG. 10) which amplifies the received signal and applies it to the classroom speakers 24. Direct audio streams, such as those associated with bell tones, PA microphones or background music, are decoded by the classroom control hub 16 and can be selected or routed through the internal amplifier to the connected classroom speakers 24.

Figure 6:
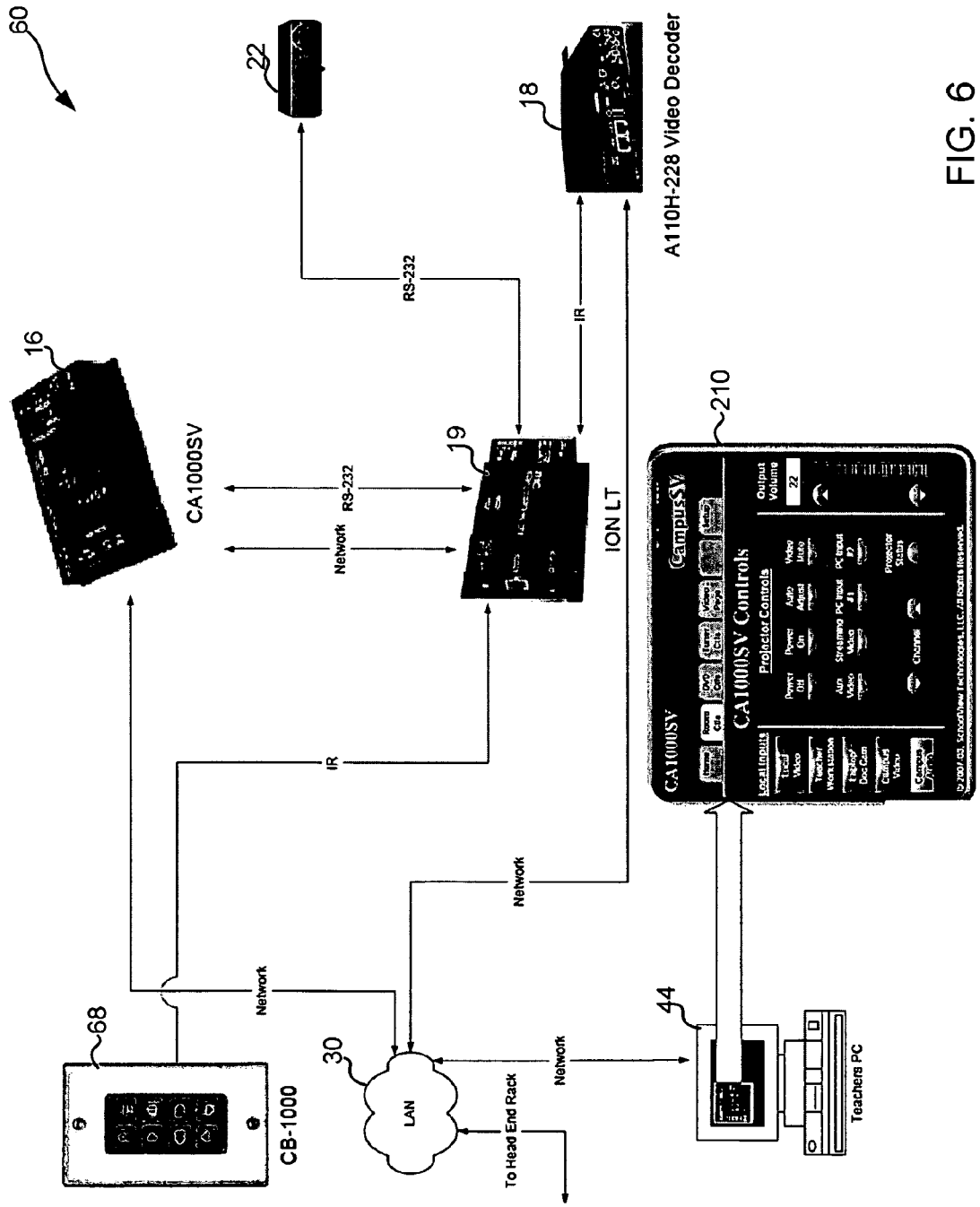
FIG. 6 is a network system block diagram showing control signal flows within a classroom portion of an audio/video network system according to an embodiment.
Figure 7:
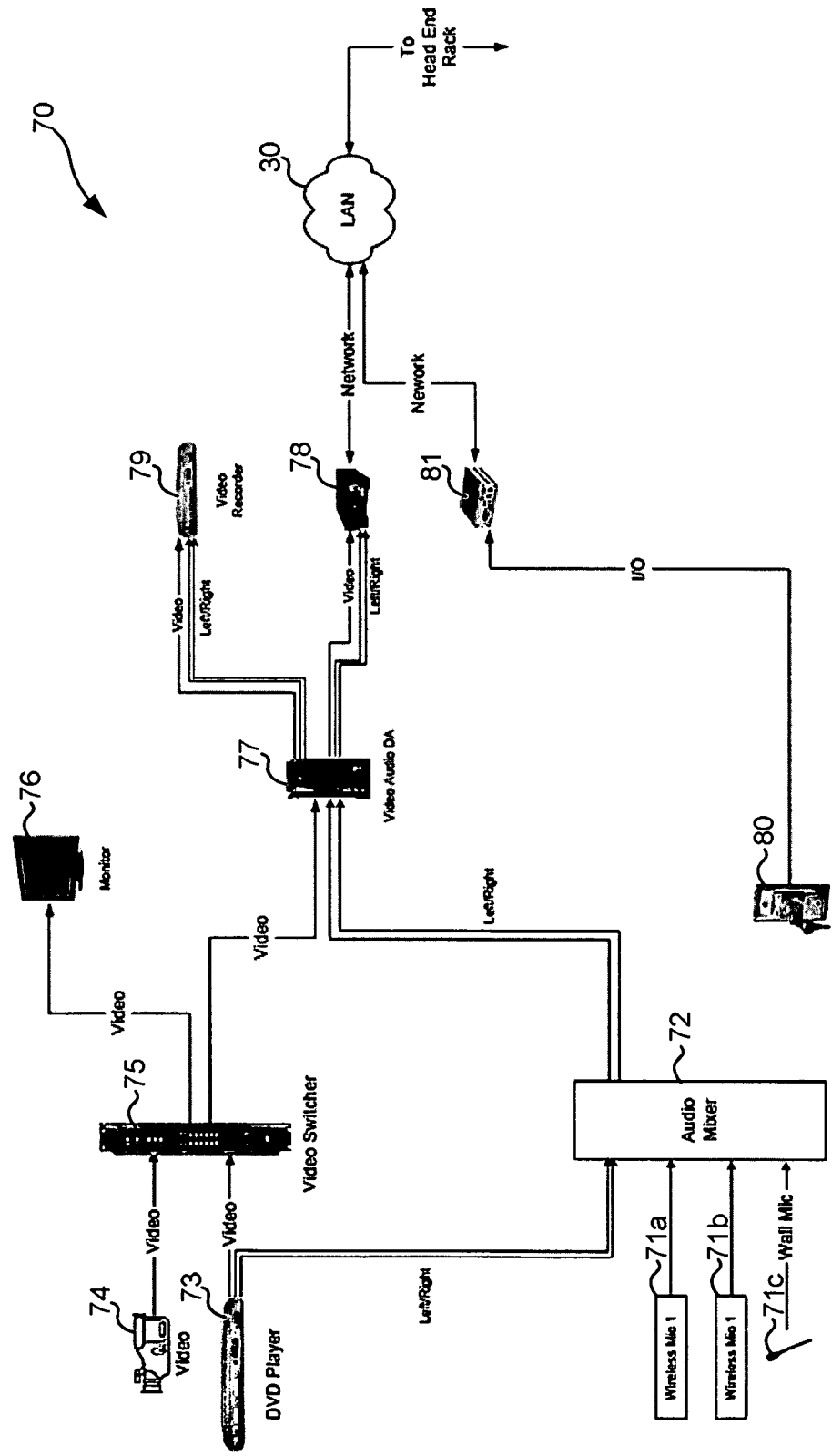
FIG. 7 is a network system block diagram showing audio and video signal flows within a remote video broadcast cart of an audio/video network system according to an embodiment.

FIG. 6 shows that the control relationships among the audio/video and computer equipment within the classroom audio/video network system. A key component in the classroom is the classroom control hub 16 which performs a control function in addition to audio mixing and amplification functions. The classroom control hub 16 is coupled to the local area network 30 and thus receives data packets intended for the classroom. Control messages received from the central processor 10 are processed by the classroom control hub 16 which then directs other classroom devices to perform required actions. The classroom control hub 16 can also receive commands from the teacher's PC 44 via the local area network 30 and, in response, control classroom devices (e.g., the classroom projector 22 and the audio/video decoder 18) accordingly. The classroom control hub 16 may be connected to a local device controller 19, such as by a network or RS-232 serial connector, which includes IR data links and wired data links (e.g., RS-232 cables) for relaying command signals to classroom devices such as a projector 22. Thus, the classroom control hub 16 can control the projector 22 by sending control commands via the local device controller 19. The local device controller 19 may also be able to receive commands via the IR data link, such as from a handheld remote controller (not shown but similar to familiar TV remotes) or from a wall-mounted control panel 68, and relay those commands to the classroom control hub 16 via a wired connection for execution. Thus, the classroom control structure enables the teacher to control the source and volume of audio/video material presented in the classroom by making selections on a graphical user interface 210 presented on the teacher's PC 44 or by pressing buttons on the wall-mounted control panel 68. Such teacher entered commands are relayed to the classroom control hub 16 which generates control signals that are sent to classroom audio/video devices via a local device controller 19. Teacher entered commands may also be transmitted from the teacher's PC 44 to the central processor 10 via the local area network 30.

The delivery and processing of audio and video sources is not limited to the head-end equipment and classrooms. For example, a remote video broadcast cart 70 may be provided as part of the school's network system that includes some or all of the equipment illustrated in FIG. 7. Such a remote video broadcast cart 70 may include an audio mixer 72 that can connect to wired and wireless microphones 71a-71c for receiving local audio inputs, and a DVD player 73 and/or video camera 74 connected to a video switcher 75 for receiving local video inputs. Audio received from the microphones 71a-71c and/or the DVD player 73 can be mixed in the audio mixer 72, with the resulting output provided to a video/audio digital amplifier 77 before being routed to an audio/video encoder 78 for connection to the local area network 30. Video and audio may also be recorded on the remote broadcast cart 70 on a video recorder 79 which may receive input from the video/audio digital amplifier 77. Thus, audio and video information recorded on the remote broadcast cart 70 may be provided to the local area network 34 for reception by the central processor 10 and any other network device. Video may also be viewed locally by a monitor 76 positioned on the remote broadcast cart 70. The remote broadcast cart 70 may also include a network appliance 81 (an example of which is the Annuncicom 100 sold by Barix AG) coupled to the local area network 30. The purpose of the network appliance 81 is to provide a programming platform that can embed control codes and provide a contact closure or digital interface to the user. This digital interface can connect with a simple key switch 80. When the key switch 80 is turned on, the switch closes a relay to the network appliance 81. The network appliance 81 receives the closure signal from the relay and transmits a message back to the central processor 10 (see FIG. 1). The central processor 10 processes this signal as an event start for the associated remote video broadcast cart and sends an appropriate event message to all rooms accordingly. When the key switch 80 is turned to the off position, the relay is opened, in response to which the network appliance 81 sends a message to the central processor 10 which causes it to send an Event End message to go out to all rooms. Software functionality within the network appliance is virtually the same as in the standard classroom control hub, with the exception that this network appliance does not need to process any of the incoming control packets or event messages.

Using the remote video broadcast cart 70, live content such as student performances may be broadcast or narrow-cast throughout the school. For example, schools may use remote video broadcast cart 70 to broadcast live events from room to room. Such live events might be a morning weekly news broadcast that the students themselves produce, to live performances, PTA meetings, football games, etc. The video and audio in such cases are broadcast over the school's local area network 30 to the assigned classrooms. Such live events may be started by a teacher or administrator turning the key switch located directly on the broadcast cart.

Central Processor 10.

The various embodiment systems include a central processor which performs a number of important tasks. These important tasks include: storing user defined parameters; managing the presentation of the user parameters via the connected user or administration touch panel (Admin TP); managing event handling; managing classroom communications; monitoring all connected system alerts; managing user passwords; managing the presentation of informational displays and graphics; providing immediate access to emergency alert graphics for display of Fire or Lock-down drills on all classroom displays; and providing a user friendly interface for school administrators to assign individual bell schedules to each school day in advance. In managing event handling, such events may include scheduled bells, PA announcements, background music, school alerts, video broadcasts, media playback (cable TV or DVDs), remote audio (such as a feed from an Auditorium). System alerts may be connected both through physical inputs and virtual network commands and may include panic buttons in each classroom, projector alarms, door access buttons (e.g., a doorbell), key-switch in an office or common area, etc. In managing bell schedules, the central processor can be configured to enable school administrators to assign individual bell schedules to each school day in advance, so that complete schedules can be recalled automatically. Bell schedules might be defined, for example, as Normal, Holiday, Finals Week, Early Release, Pep Rally, etc.

Figure 8:
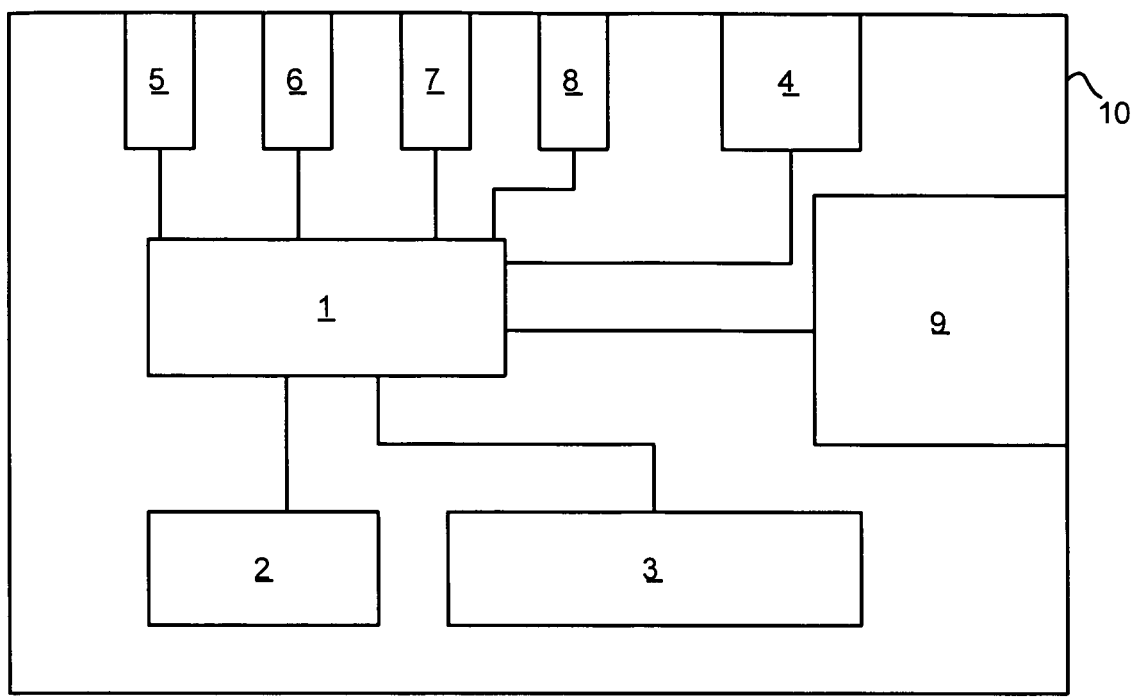
FIG. 8 is a circuit block diagram of a central processor suitable for use on an audio/video network system according to an embodiment.

Typical elements in the central processor 10 are illustrated in FIG. 8. In an embodiment, the central processor 10 may include a processor 1 coupled to volatile memory 2 and non-volatile memory, such as flash memory 3. A number of control ports 5-8 may be coupled to the processor 1 and configured to communicate control signals from the processor 1 to control external devices, such as DVD players, satellite (SAT) television receivers, cable television receivers, video cassette players, compact disc players, digital audio converts, and similar equipment. The processor 1 is also coupled to one or more network interface circuits 4 coupled to the school network 30, such as an Ethernet network interface circuit. The processor 1 is configured with processor-executable software instructions to manage the network and perform the tasks described herein. A central processor 10 may also include a portable media reader, such as a compact disc (CD) drive 9, coupled to the processor 1 which may be used for uploading software instructions to memory 2, 3. A commercially available central processor 10 suitable for use in the various embodiments is a Ni3100 NetLinx Integrated Controller sold by AMX®. By way of example of components that may be included in the central processor 10, the Ni3100 includes a 404 MIPS processor, 64 MB of volatile memory, 128 MB of flash memory, 1 MB of non-volatile memory, eight infrared serial control ports, eight digital input/output control ports, eight relays; seven configurable serial ports, and three network communication (AxLink ICSNet and Ethernet) control ports.

To provide local control of audio, visual and information sources within the classroom an embodiment includes a local device controller 19 within the classroom portion of the network. Typical elements in the local device controller 19 are illustrated in FIG. 9. In an embodiment, the local device controller 19 may include a processor 91 coupled to memory, such as volatile memory 92 and nonvolatile (e.g., flash) memory 93, to an infrared (IR) wireless communication circuit 95, and to one or more serial communication ports 96, 97. Additionally, the processor 91 may be coupled to a network interface circuit 94 for sending and receiving communications via a local area network 30. A commercially available local device controller 19 is the ION-LT2 IP-Based Device Controller sold by Calypso Control Systems, Inc. of Hudson, Wis. By way of example of components that may be included in the device controller 16, the ION-LT2 includes a server configured as a web server, a 128 event by 512 action database in memory, two serial ports, two relay ports, and dual infrared and VGA detect ports.

The processor 91 of the local device controller 19 is configured with processor-executable software instructions to receive and process commands received via the IR, serial and network interfaces 94-97, and to transmit control commands to devices, such as a classroom projector 22, in response to received commands. For example, a series of commands may be received from a wall-mounted control panel 68 via an IR or wired data link to turn on the classroom projector 22, to connect a selected channel to project, and to control the audio volume in the classroom. The processor 91 may be configured with software to receive and determine the meaning of each of the commands, send any control signal to the classroom projector 22 to power on, send a control signal via the IR data link, for example, to the video decoder 18 identifying an appropriate video channel to begin decoding, and pass the decoded video signal to the classroom projector 22, and send volume control signals back to the classroom control hub 16.

Figure 10:
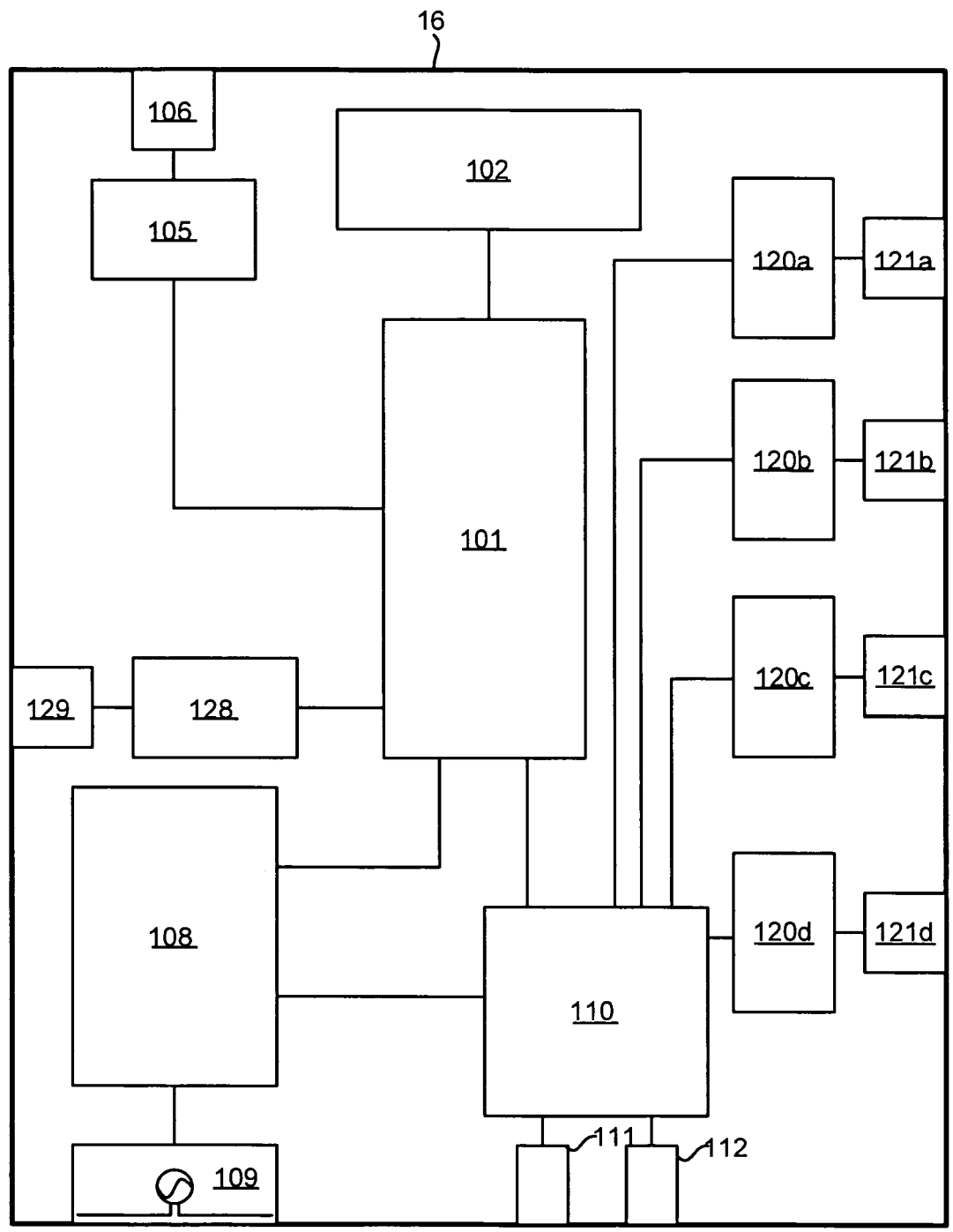
FIG. 10 is a circuit block diagram of a classroom control hub suitable for use on an audio/video network system according to an embodiment.

In the classroom, a classroom control hub 16 provides a central receiver for information and commands sent via the network 30 and from the teacher's PC 44. In an embodiment, classroom control hub 16 also serves as an audio switch, audio mixer and audio amplifier. An example embodiment of the classroom control hub 16 is illustrated in FIG. 10. In this embodiment, the classroom control hub 16 includes a programmable processor 101 that is coupled to memory 102. The processor module 101 is connected to a network interface circuit 105 and through this circuit to a network coupler 106, such as an Ethernet socket. The processor 101 is configured to recognize and process data packet addresses as those corresponding to the classroom control hub 16 while ignoring data packets addressed to other devices. Additionally, the processor 101 may be configured to decode data audio packets in order to provide an analog audio signal that can be amplified by the audio amplifier 110. Also connected to the processor may be an audio mixer circuit 108 which may be connected to a wireless microphone receiver 109. An audio amplifier 110 may be included that is coupled to the processor 101 and to audio output jacks 111, 112. The audio amplifier 110 may be connected to a plurality of audio input receiver circuits 120a-120d, each of which is connected to an audio input jack 121a-121d. Additionally, the processor 101 may communicate directly with a personal computer, such as the teacher's computer 44 via the Ethernet network via the coupler 106. The classroom control hub 16 may also include additional circuitry, such as additional input/output connectors and switching circuits (not shown separately) for connecting one or more of the various audio inputs to the audio amplifier 110. A commercially available classroom control hub 16 is the CA1000SV sold by Calypso Control Systems, Inc. of Hudson, Wis.

The processor 101 of the classroom control hub 16 can be configured with software to perform functions of the network described herein. For example, the processor 101 may be configured to receive command signals from the central processor 10, the local device controller 19, and/or the teacher's computer 44 to select a particular audio program to play over the classroom speakers 24 and adjust the volume by controlling the audio amplifier 110. As another example, the processor 101 may be configured with software to control the audio mixer 108 to mix together sound received from the wireless microphone receiver 109 with another audio program received over one of the plurality of audio inputs 120a-120d. As a further example, the processor 101 may be configured with software to receive commands to activate the classroom projector 22 via the local area network and in response send a command to the local device controller 19 to send a power-on signal to the classroom projector 22.

In a further role, the classroom control hub 16 can function as a network interface to communicate signals from the classroom to the central processor 10. For example, the pressing of a wall pushbutton module 68 may send an IR signal to the local device controller 19 which sends a signal to the classroom control hub 16. The classroom control hub 16 can interpret the button press and send a corresponding signal via the local area network to the central processor 10. For example, the wall pushbutton module 68 may include a panic button which when pressed signals the classroom control hub 16 to send an emergency alert message to the central processor 10 via the network. In another configuration, the classroom control hub 16 can serve as the network interface between the teacher's computer 44 and the central processor 10 by formatting and transmitting messages on the network received from the teacher's computer 44.

Touchscreen control panels can be positioned in various locations within the school building. In addition, each control panel can be remotely accessed by PCs, such as the principal's desktop computer 40. These control panels communicate with the central processor 10. The administration touch panel, either directly or via the principal's computer 40, graphically displays system information and user administrative controls via user friendly icons. Signals indicating a touch or click on a particular graphical user interface icon displayed on either the administration touch panel 42 or the principal's user interface are transmitted to the central processor 10. The central processor 10 processes the received signal to determine the meaning or command associated with the icon touch, generates an appropriate command packet and sends the command via the school network to all classrooms and remote display/annunciator equipment using the addressing scheme described below. If the command sequence entered into the administration touch panel or principal's control user interface is to transmit a particular audio/visual source to one or all locations, the central processor 10 activates that source and causes the audio/video source to begin streaming onto the network with the appropriate address included in each data packet. For example, the command sequence could be to transmit the national anthem to all speakers throughout the school. In response to such command, the central processor 10 may activate an MP3 player 12r to begin playing the national anthem and command an audio encoder 14r to encode the music with data packets addressed to all audio devices.

Another unique aspect of the various embodiments is the combination of all audio, video, and control communications within a single network. Traditional systems for audio, video and control communications were handled by dedicated systems. The various embodiments incorporate existing systems as well as new technologies into a single integrated network system. How these systems are integrated is described below.

Audio Integration.

Through the use of the audio encoders 14 and audio decoders within the classroom control hub 16, the various embodiments send all audio (such as bell tones, PA announcements, background music, doorbell alerts, etc.) to any or all zones and classrooms via the local area network. The audio streams utilize what are called multi-cast addresses, which are UDP packets that are routable across multiple domains. These multi-cast streams are generated or encoded at the central head-end by an audio encoder 14. Using the addressing scheme described below, the network backbone transmits these multi-cast streams to all classroom control hubs 16 and other receivers with virtually no delay. Using the addressing in the command packets described in more detail below, the classroom control hub 16 decodes the multi-cast streams and, if the audio signal was addressed to the particular classroom control hub, amplifies the audio signals and applies the amplified signal to the classroom speakers 24.

Broadcast audio data packets include an IP address and a port number as is typical in Internet communication pathways. In a typical implementation of the various embodiments, audio streams will be assigned the same IP address, such as 224.1.1.120 (or thereabouts as a specific network or school district may assign a specific address per school around this address). In addition to the IP address, audio data packets will include a port number assigned based upon the source of the streaming audio program. For example, in a typical implementation, audio encoder #1 (for PA and microphone audio) may be assigned port 12311, audio encoder #2 (for program audio) may be assigned port 12312, audio encoder #3 (for bell audio) may be assigned port 12313, and audio encoder #4 (for background music) may be assigned port 12314. This list of port numbers is for example purposes only as the port numbers are arbitrary provided it does not conflict with another IP device on the school's local area network 30.

In the classroom, audio stream data packets are decoded by the classroom control hub 16 which is configured with software to select data packets from the local area network 30. The classroom control hubs 16 are informed of the IP addresses and port numbers of particular audio events in event start/end control packets which are transmitted by the central processor 10. The audio streams run all the time so that they are continuously available for processing within the classrooms. Only those classroom control hubs 16 that need to process a selected audio stream will do so.

Using such multi-cast streams in combination with high-speed audio encoders and decoders ensures the audio streams are received by all rooms simultaneously in the same way that the command packets are received. In this way, the various embodiments eliminate the old method of using a point-to-point switcher to connect audio sources to speakers, which is slow and requires a single individual command per classroom to connect an audio feed to all classrooms.

Video Integration.

In much the same way, the various embodiments stream video to all zones and classrooms through the use of video encoders and decoders. Again, using multi-cast addresses and UDP video streams in combination with high-speed video encoders and decoders, the embodiments can send video packets to all zones and classrooms without switching delays. Further, within the classrooms, the embodiments present the available video streams to a teacher in a manner very similar to the way that any cable TV set top box provides TV channels. Each stream is "tuned" by the classroom video decoder 18 by selecting the associated channel on a wall mounted push button panel 68 or a graphical user interface presented on the teacher's computer 44. In this way, teachers are able to select a particular video feed using the streaming technology simply by entering simple channel up/channel down or channel selection commands which is easy for any teacher to understand.

Video data packets are addressed in a manner similar to audio data packets. Broadcast video data packets include an IP address and a port number as is typical in Internet communication pathways. In a typical implementation of the various embodiments, video streams will be assigned an IP address in the range of approximately 225.168.1.241 through 225.168.1.249 or thereabouts. Depending on the number of video streams per school and the number of schools in the district, the addresses will be adjusted so that each stream is assigned a unique IP address. In addition to the IP address, video data packets will include a port number. For example, in a typical implementation, all video streams will be assigned port 51018.

Within the classroom, the video decoder 18 will be pre-programmed with the available video streams, assigned to individual channels. A typical assignment list might look like the following:

Ch 1: igmp://225.168.1.241:51018;
Ch 2: igmp://225.168.1.242:51018;
Ch 3: igmp://225.168.1.243:51018;
Ch 4: igmp://225.168.1.244:51018;
Ch 5: igmp://225.168.1.245:51018;
Ch 6: igmp://225.168.1.246:51018;
Ch 7: igmp://225.168.1.247:51018;
Ch 8: igmp://225.168.1.248:51018; and
Ch 9: igmp://225.168.1.249:51018

In the classroom, video stream data packets are processed by the video decoder 18. The classroom control hub 16 will receive event command messages and should a message be addressed to a classroom, the control hub in that classroom will instruct the video decoder 18 to "tune" in the associated event channel.

The various embodiments are able to integrated the system architecture described above with reference to FIGS. 1-7 due to innovations in network addressing used on the school's local area network, and the use of UDP multi-cast streams (vs. TCP distribution) for two-way network communication. These innovations together ensure the distribution of audio and visual information to classrooms and messages sent to the same classrooms are accomplished with minimal delay regardless of the size of the institution.

Bit-Wise Addressing.

The unique addressing scheme used in the various embodiments for delivering message packets to particular destinations within the school data network eliminates transmission delays which render conventional network systems unsuitable for most school-wide applications. On virtually every network or communication backbone, each individual piece of equipment must, at some level, be uniquely addressed. For instance, in the public telephone network each house has a unique phone number, and on the Internet each computer has a unique Internet Protocol (IP) address. A number of addressing schemes are known and in use in various data networks; however, all known addressing schemes, including IP addressing, introduce too much delay and require too much information to enable the school communication system of the various embodiments to function as desired. In particular, delays in delivery of audio and visual signal and alarms induced by conventional addressing would result in sounds and video being generated at different times in different classrooms and zones within the school. For a school-wide broadcast, the result would be cacophony. To overcome the delivery delays caused by known addressing schemes, the various embodiments use a new specialized addressing scheme that can be implemented with off-the-shelf hardware (e.g., audio and video decoders, control processors, computers, etc.) which are configured with individual IP addresses. This specialized addressing scheme is much more efficient than traditional IP addressing, enabling the network system to ensure that an announcement at the start of an event occurs simultaneously on all devices and virtually without any delay.

To accomplish such delivery performance the new addressing scheme converts IP addresses for individual off-the-shelf hardware (e.g., audio and video decoders, control processors, computers, etc.) into a bit-wise address. Bit-wise addressing is much more efficient, and the manner in which the address conversion is performed allows addressing of a very large number of devices simultaneously.

All conventional IP addresses consist of 4 numbers in the range of 1 to 255. For example, a conventional IP address might be 192.168.25.73. Each network device has a unique set of four numbers. To ensure messages can be delivered on a network, no two devices on a single network can use the same group of four numbers. As a result, IP addresses are very large numbers which require a finite time to transmit and receive.

In the bit-wise addressing scheme, not all of the information included in the four-number IP address is required. Because a school network is of finite size much smaller than the addressing domain of the Internet, the bit-wise addressing scheme can summarize the information in device IP addresses into a much smaller number than can be processed much faster. The bit-wise addressing scheme leverages the fact that all networks, public and private, make use of what are called Class A, B, and C ranges for the assignment of IP addresses. How these classes are utilized is not important to the present invention other than the fact that within a school district or even an individual school, the school network will not use the full set of four numbers or even ranges of numbers. Instead, a school network will use what are referred to as private IP domains or ranges of addresses. For instance, a school might have only one outbound network link to the public Internet. As a result, all computers within the school that can access the Internet will share a single public IP address. However, within the school building, each computer will have a single, private IP address. Each networked device on the school network of the various embodiments is very much the same in that the network assigns private IP addresses to each device. Further, a typical school will utilize only a handful or fewer complete ranges of addresses or domains. For example, a single private IP address domain might be 10.139.52.X, where X can be any number from 1 to 255. Each device in the audio/visual network of the various embodiments will, generally, also be grouped on one or more of these domains. This grouping of domains is made use of in the new bit-wise addressing methodology.

To allow the central processor 10 to communicate with each device on the network (e.g., each classroom control hub 16) with minimal overhead, the unique IP address of each networked device is converted down to a single bit with the address bits grouped for each domain. The central processor 10 then can send out a single packet on each domain in such a way that all devices receive the packet of information simultaneously and individually determine if their address is included in the message.

To explain the bit-wise addressing scheme, consider the example of a small school that uses a single domain for its local area network, such as 10.52.33.X. The primary classroom component that will receive the communication packets is the classroom control hub 16 (e.g., the CA1000SV by Calypso). This device includes a processor 101 that handles the majority of the control within the classroom. If the classroom control hub 16 are numbered in order, starting with address 1 and there are 32 classrooms the IP addresses of these devices will fall in the range of 10.52.33.1 to 10.52.33.32. As this illustrates, only the last number differs in all the addresses (i.e., ranging from 1 to 32). Therefore, the addressing scheme can dispense with the first three numbers (i.e., 10, 52 and 33) and still be able to individually address message packets. In bit-wise addressing, address numbers that are significant (in this example the fourth number in the address) are translated into individual bits within a larger stream of bits so that each bit can represent a particular addressed device. For example, the following list of thirty-two 0's (zero's) 0,0,0,0,0,0,0,0, 0,0,0,0,0,0,0,0, 0,0,0,0,0,0,0,0, 0, 0,0,0,0,0,0,0,0 includes four groups of eight zero's. (As discussed below, in a preferred embodiment the bit-wise addressing comprises 256 zero's (32 groups of 8).) To indicate that the first room is addressed (in other words the room is to be part of the associated communication event), the first zero will be changed to a "1" (one). To address the second room, the second zero is changed to a "1" and so on. So, if an event included just the first, second and ninth classrooms, the group of bits in the bit-wise address will look like this:

1,1,0,0,0,0,0,0, 1,0,0,0,0,0,0,0, 0,0,0,0,0,0,0,0, 0,0,0,0,0,0,0, 0,0

As this example shows, the only "1's" are in the first, second and ninth positions within the 32-bit address. The beauty of using this method is that this string of bits (1's and 0's) can further be encoded into the numbers 0-9 and letters A-F or into regular ASCI characters, which are eight-bit (i.e., one-byte) digital codes. This encoding can then be processed and decoded by the classroom control hubs 16 and other networked devices so that each device can determine whether it is addressed or not. For example, integer-to-Hex conversion may be used to reduce the number to letters and numbers. In this method, each set of eight bits is split into two groups of four bits, with each group of four bits assigned a value as follows: bit 1=1; bit 2=2; bit 3=4; bit 4=8; bit 5=1; bit 6=2; bit 7=4; and bit 8=8. The four bits are summed together, so that a string of eight bits such as 0011 0101 would equate to 3 and 5 (the bits are assigned in reverse order). Then, the "3" and the "5" values would be the ASCII digits that are sent to represent this particular 8 bit packet. In this case, the two numbers would be sent as "35." If the sum is 10 or greater (15 being the max if all four bits are 1), then the digit is replaced with a letter as follows: Sum 10≡A; Sum 11≡B; Sum 12≡C; Sum 13≡D; Sum 14≡E; and Sum 15≡F. So, if all eight digits are 1's (1111 1111), the encoded ASCII sent would be FF. In this way, any combination of bits from 0000 0000 (sent as 00) to 1111 1111 (sent as FF) can be encoded as ASCII information (digits 0-9 or letters A-F), providing a clean way to monitor traffic and/or to process information in a minimum amount of data.

In a preferred embodiment, the addressing scheme uses 256 address bits in an address string of 1's and 0's so that 256 different networked devices can be individually addressed using bit-wise addressing, a number that is typically adequate for most school implementations. Since strings of eight bits can further be encoded into the numbers 0-9 and letters A-F, a complete event message, including the actual event instructions and all 256 address bits can be sent completely transmitted in less than 250 bytes, a very small packet for any data network.

On the receiving end, in the classroom, each network device (e.g., classroom control hub 16) knows its own IP address (such as 10.52.33.9, for example). To recognize it's bit-wise address, the network device strips off the first three numbers of its IP address and uses the last number (9 in this example) to determine which particular bit in the string of 256 bits to interrogate in order to determine if an incoming data packet is intended for its local classroom. If its address bit is set (such as bit 9 in this example), the networked device will process the remainder of the message which will contain the event instructions and perform whatever actions are necessary. If, however, its address bit is not set to 1, the whole message is ignored.

Bit-wise addressing can be implemented by configuring the networked devices, including the central processor 10 and the classroom control hubs 16 with software to implement the addressing scheme. To further enhance overall performance, the central processor 10 does not create the address packets in real-time. When a user sets up a system initially, the user will define the various groups of classrooms that are associated with each event. At that time, the control processor 10 will also prepare the associated addressing scheme associated with the corresponding set of network devices. The address packet will then be stored in permanent memory. When the event is actually triggered, the control processor 10 will simply prepare the appropriate event details, along with the stored address packet and broadcast the message to all devices as a UDP packet as described below. In this way, an event packet can be prepared and broadcast very quickly without the need to re-calculate the address bits for each and every event. In this way, the calculations for each address packet are handled when the system is idle and therefore events are not delayed while a packet is assembled.

In a similar manner, the networked devices (e.g., classroom control hubs 16 and video decoders 18) can be configured with software to process received message packets to check the bit within the bit-wise address number that corresponds to the particular device in place of processing an IP address. If a 1 is present in the bit-wise address digit corresponding to the networked device, then the remainder of the message packet may be processed in a conventional manner. Further, since each classroom control hub 16 receives the packets in parallel and since each device calculates their involvement in an event individually, the entire school can connect to a single event almost simultaneously regardless of whether the school is small or large.

Control packets that include the bit-wise addressing also define whether a particular event is an audio or video event and what source that the assigned classroom control hub will need to connect to (i.e., what IP address and port number). For a video event, the control message packets include the channel number (which, as described above, is assigned to a particular IP address and port number) as part of the message body. For an audio event, the command message packets may simply include the type of audio event (such as 1, 2, 3, or 4) that is associated with the specific command packet, so the classroom control hub 16 can determine which of the audio encoder ports (i.e., which audio port number) should be received and decoded to receive the audio event.

UDP Packet Message Distribution.

A second innovation in the communications process involves the manner in which event data packets are sent to the classrooms once the encoded message is created by the central processor 10. On any data network, there are only two ways to send packets of information, as Transmission Control Protocol (TCP) packets and as User Datagram Protocol (UDP) packets. TCP packets are by far the more popular method for most Internet communications because all TCP packets are sent as direct Point-to-Point messages. For instance, a request for a particular web page on the Internet is sent to a specific server with an IP address corresponding to the URL, and that server will send back the requested web page (as an HTML script) back to the requesting computer and only that computer. In that regard, TCP packets are delivered much like telephone calls which connect one phone directly to another. TCP protocol is highly reliable and provides specific information to the requesting party and only that party. However, TCP is also a very slow method when one device needs to send the same information to a large number of receiving devices (i.e., broadcast).

UDP, on the other hand, functions more like AM radio or Cable TV than a telephone. UDP packets are not sent to a specific device, but rather are put onto the network in a way that all receiving devices that are listening can receive the packets simultaneously. In the various embodiments, the central processor 10 simply sends out the broadcast packet to each domain that contains networked devices, such as the 10.52.33X example discussed above. The various network switching elements pass UDP packets equally to all switch ports associated with the particular domain, and the classroom control hub 16 devices receive the packets and process them accordingly. Since the central processor 10 can communicate across all domains, sending a single packet to each one, these communication messages arrive at all devices without any delay, even in the largest school networks. Further, the size of a UDP-based network system is completely scalable from the smallest school to the largest campuses since increasing the number of networked devices does not slow the distribution of UDP messages.

UDP Packet Classroom to Central Processor Communication.

In a similar manner, responses from the classroom (e.g., from the classroom control hub 16) back to the central processor 10 are sent as UDP packets instead of TCP packets. Doing so solves a communication latency problem that could arise in large school networks if hundreds of networked devices send commands and/or status updates to the central processor 10 on a regular basis. The various embodiments obviate the need for a server, instead relying upon a central processor 10 (e.g., the NI-3100). Such central processors 10 are not capable of handling a large volume of requests like a typical web server, and so would be overwhelmed by hundreds of connections occurring all the time. Further, the classroom control hubs 16, serving as the teacher's interface, should provide a fast and responsive user environment. Therefore it is undesirable for the classroom control hub 16 to have to wait for an open connection to the central processor 10 before transmitting a command or services request.

To provide prompt responses to commands and service requests from classroom control hubs 16 and to avoid bogging down the central processor 10 with network access requests, the various embodiments use UDP packets to transmit commands and service requests to the central processor 10. When a classroom control hub 16 has some information to send to the central processor 10, it creates a UDP packet. This UDP packet is much simpler and smaller in size than an equivalent TCP packet as it contains only the information necessary to communicate its message (no bitwise manipulation here). The classroom control hub 16 broadcasts the UDP message, but rather than broadcasting this message to all devices, like the central processor does on the outbound path, the classroom control hub 16 addresses the packet directly to the central processor 10 using its full IP address.

The central processor 10 is configured with software to receive the UDP packets as they arrive and process each packet individually. Along with the packet of information, the central processor 10 will receive the IP address of the classroom control hub 16 that originated the message. As a result, the central processor 10 will know which classroom sent the message and can quickly process the message accordingly.

Through this process of addressing message packets using bit-wise information along with the use of UDP broadcast of outbound packets and UDP communication of device updates and classroom commands, the various embodiments provide a more efficient and effective network-based control architecture than available previously.

Not only do the various embodiments address individual classrooms (i.e., individual classroom control hubs 16) in the manner described above, but the embodiments can also send commands to networked devices such as, for example, to power on classroom projectors 22, to remotely turn on/off local sound systems (e.g., in an auditorium), to activate/deactivate remote display terminals 42, to remotely lock/unlock doors via remote door release triggers, etc. The embodiments can also provide or receive remote event triggers via network enabled key-switches using the network infrastructure and communication protocols described above.

Teacher's Web Client.

Figure 11:
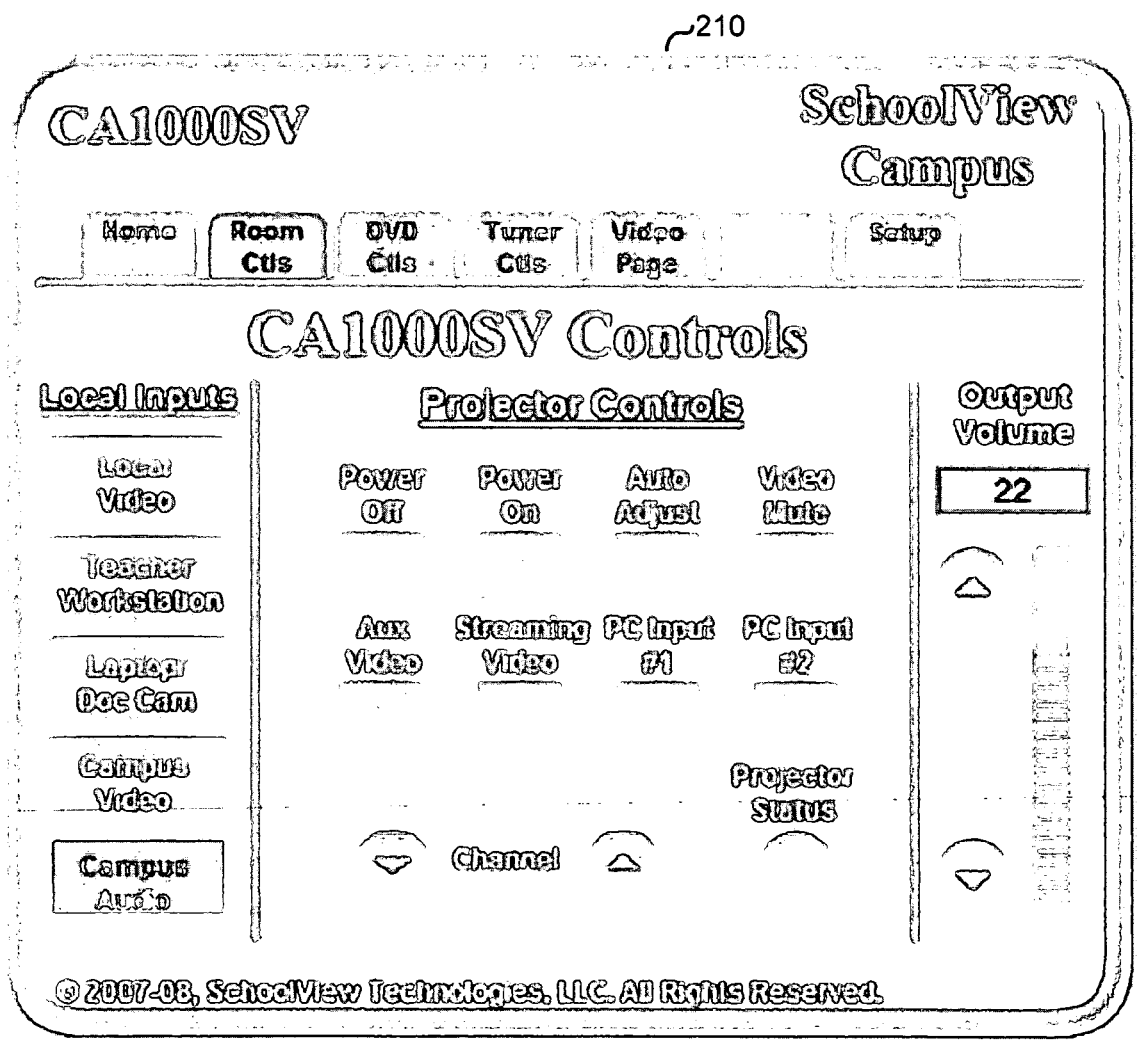
FIGS. 11-15 are graphical user interface displays that may be presented on a computer for controlling component of an audio/video network system according to an embodiment.
Figure 12:
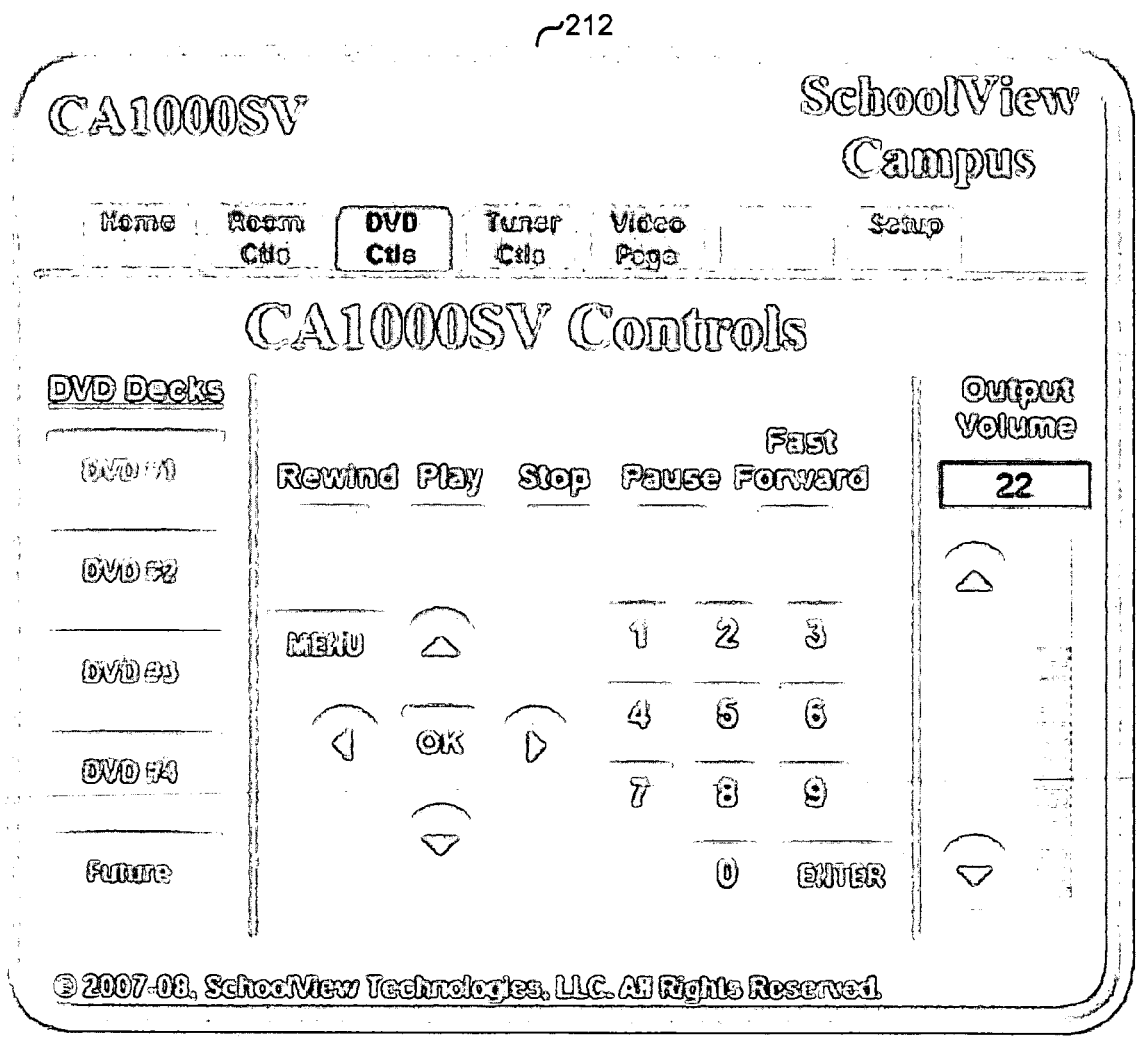
Figure 13:
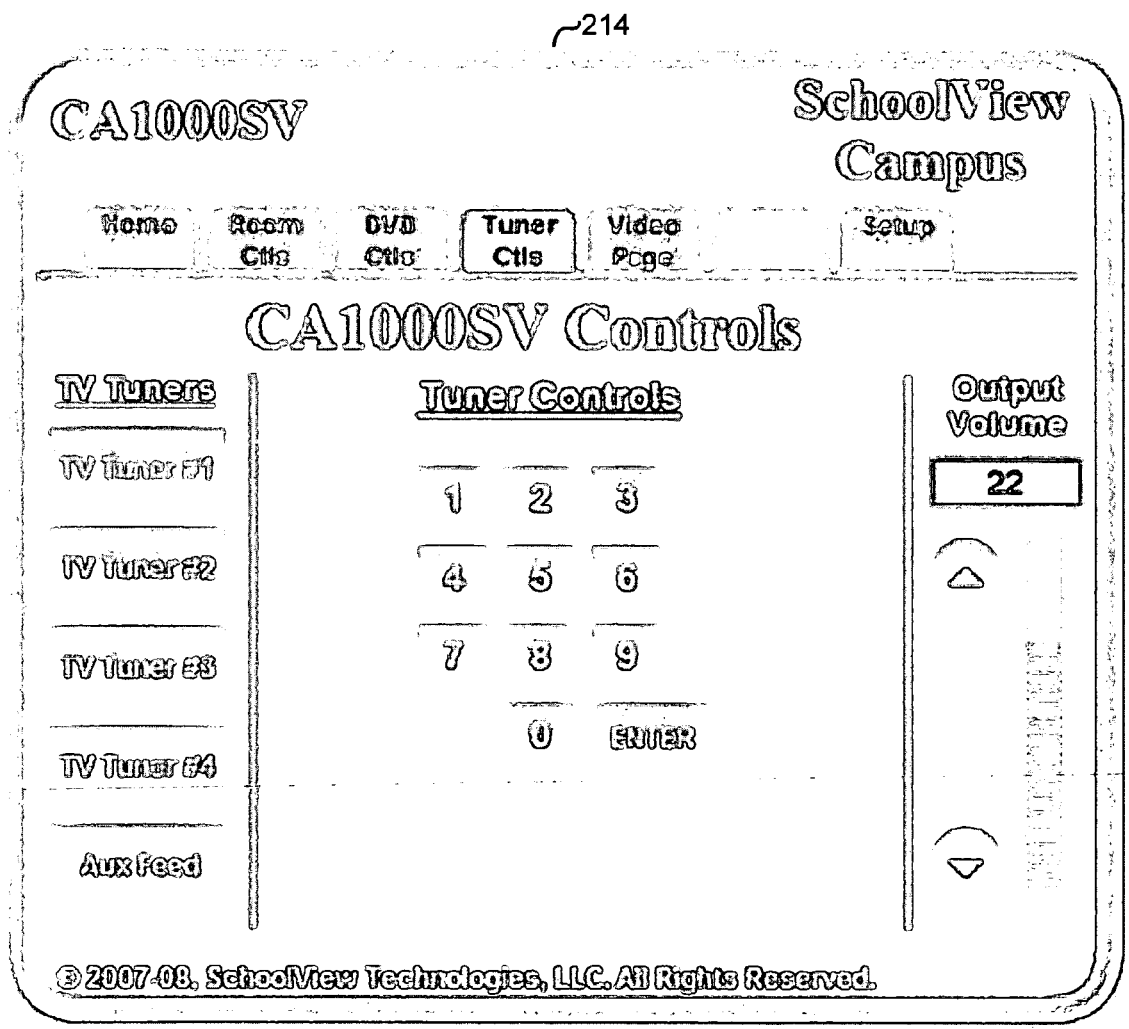
Figure 14:
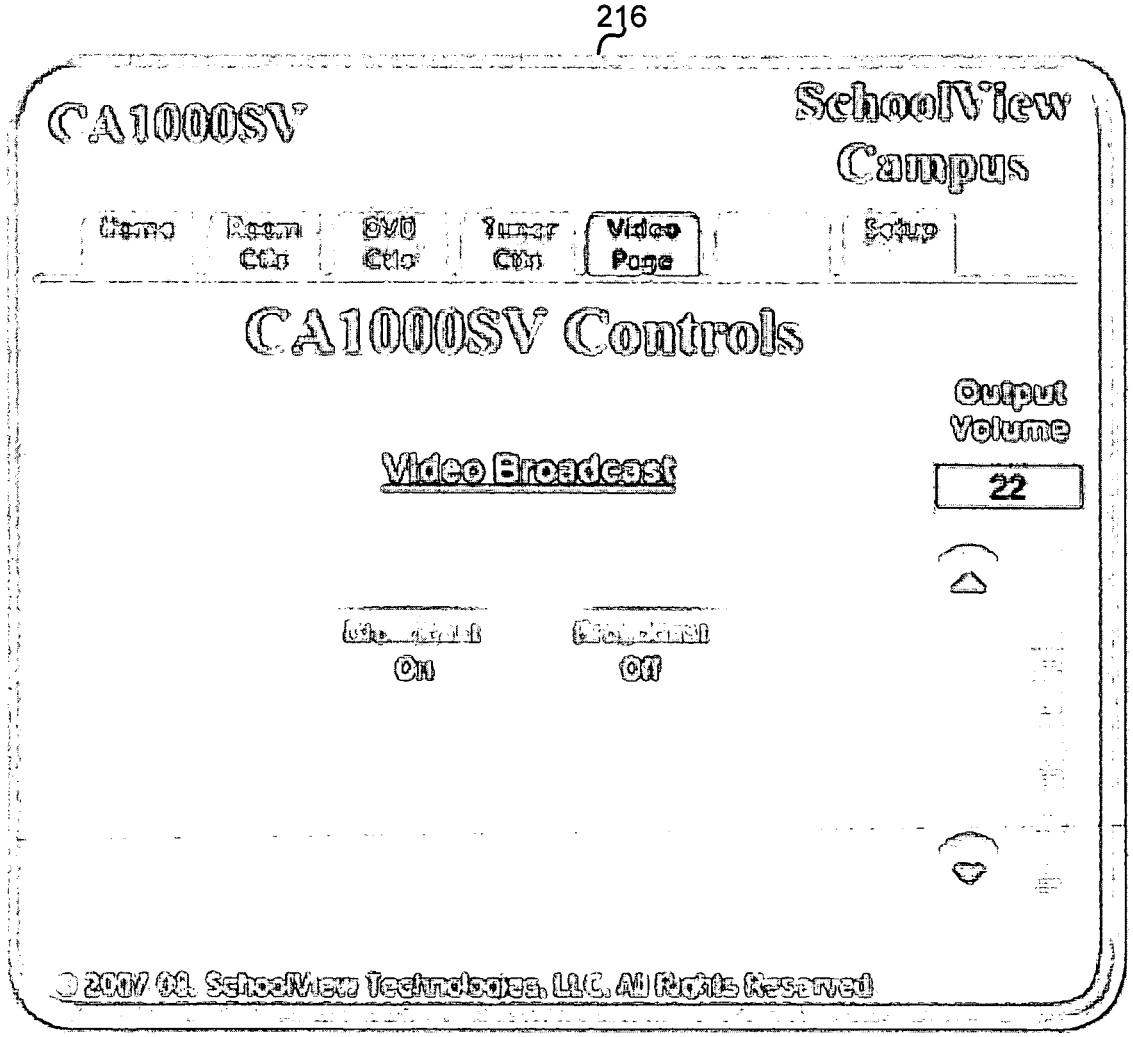

As described above with reference to FIGS. 5 and 6, the various embodiments provide an in-classroom networked system of communication and control devices, including projectors 22, local media players (e.g., a DVD player 62), document cameras 63, wireless microphones 65, networked computers 46, 48 and a sound system 16, 24. As described above with reference to FIG. 6, classroom devices and head-end resources can be controlled from wall mounted touch pads 68 and the teacher's PC 44. On the wall in each classroom may be provided touch pad 68, such as an 8-button panel (e.g., the CB-1000 8-Button Control Panel sold by Calypso Control Systems, Inc.) for direct control of the projector 22 and other devices in each room. The various embodiments include software that can be implemented on the teachers PC 44 to configure that computer to provide the teacher with control tools as well. As illustrated in FIGS. 11-13, the software operating on the teacher's PC 44 can provide a user friendly graphical user interface (UI) control panel 210 for controlling classroom devices as well as providing more advanced features. Using the UI control panel 210 illustrated in FIG. 11, a teacher can directly control the projector 22, volume level of the classroom speakers, select an input source (such as the classroom document camera or a local PC). Using other UI control panels 212, 214 illustrated in FIGS. 12 and 13, the teacher can also select and control a number of head-end audio/visual assets 12, such as DVD players (see FIG. 12) and Cable TV tuners (see FIG. 13).

To access the teacher's UI control panel 210 from the teacher's PC 44, the teacher enters the network address of the classroom's control hub 16. This address may be set up as a single shortcut on the teacher's PC desktop. Each time the UI control panel 210 is accessed the teacher may be required to enter a password to access the control pages. Teacher passwords can be defined on the central administration computer 40 and managed by the central processor 10. Upon successful entry of the password, the teacher is presented with the UI control panel 210 or another menu.

To control classroom devices using the UI control panel 210 on the teacher's PC 44, the teacher may make selections by clicking on hyperlink virtual buttons in a manner very familiar to anyone comfortable using web browsers and other software implementing a graphically user interface. In response to a click on a hyperlink virtual button, the teachers PC 44 is configured with software instructions to generate a command message packet, address the packet to the device associated with the virtual button, and transmit the message packet onto the local area network. For example, to activate the projector 22, a teacher may click on the "power on" virtual button presented in the UI control panel 210 (see FIG. 11). In response, the teacher's PC 44 generates a projector power on command packet, addresses the packet to the classroom's control hub 16, and transmits the packet on the local area networks 30. This command packet is received by the classroom control hub 16, which generates and sends a command signal to the local device controller 19 commanding it to activate the projector 22. As described above, the local device controller 19 receives the command from the classroom control hub 16, and in response generates a power on signal that is communicated to the projector 22, such as by a serial data link (e.g., an RS-232 cable).

To control resources located at the head end, the teacher may access a DVD control menu 212, such as by clicking on a menu tab across the top portion of the UI control panel 210. The DVD control menu 212, shown in FIG. 12, presents menu options to enable the teacher to control DVD equipment located at the school's head end. For example, the DVD control menu 212 may present a series of hyperlink virtual buttons enabling the teacher to select particular DVD players, and to control the normal functions of a DVD player, such as volume, "play," "rewind," "stop," "pause," and "fast-forward," etc. In response to a click on a hyperlink virtual button, the teacher's PC 44 is configured with software instructions to generate a command message packet which is sent to the classroom control hub 16 which will either process the command message directly, such as to control volume or turn the projector 22 on or off, or route the control message via the local area network 30 to the central processor 10, such as for functions like DVD selection or DVD control commands (e.g., play, stop, pause, etc.). For example, to begin playing DVD#1, a teacher may click on the "DVD#1" virtual button, click on the "play" virtual button and click on a volume adjustment virtual button presented in the UI control panel 212. In response, the teacher's PC 44 generates an appropriate command UDP packet which is sent to the classroom's control hub 16. In response, the control hub 16 may transmit the DVD selection and "play" messages via the local area network 30 to the central processor 10, but the control hub will execute the volume control command itself. Such command packets from the classroom control hub 16 are received by the central processor 10, which generates and sends command signals to DVD #1 12*e* causing it to begin playing. The central processor 10 may also send event messages to the classroom control hub 16 to inform the classroom to "tune" in or connect to the DVD's particular video stream. In a similar manner, a teacher may use a tuner control menu 214, illustrated in FIG. 13, to select a particular cable or satellite television tuner 12*h*, 12*i*, and to clicking on a number pad, with the classroom control hub 16 providing an intermediary communication role with the central processor 10.

Figure 15B:
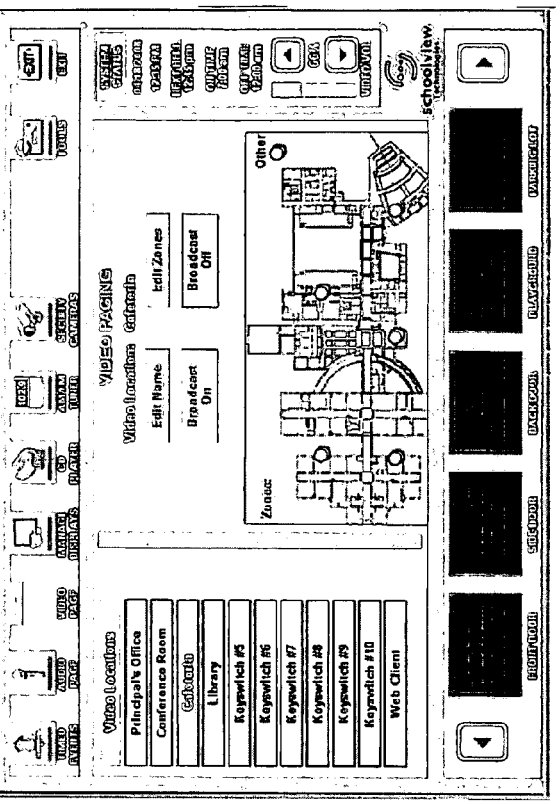
Figure 15A:
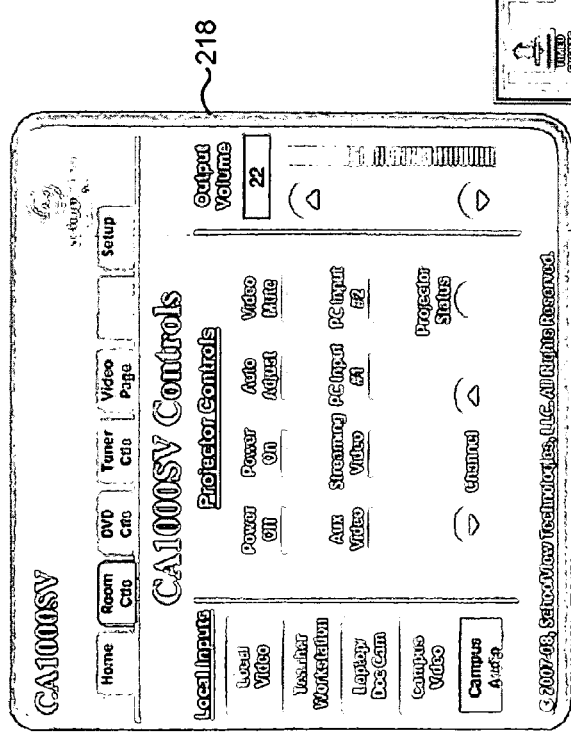

These control menus may be layered so that additional menus may be accessed via a touching or clicking on particular hyperlink virtual buttons. Similar user interface control menus may be presented to administrators on their personal computers 40 or on administration touchscreen displays 42 located in various places within the school facility. For example, FIG. 15B illustrates a video paging control menu 220 with menu selections for "cafeteria" and "broadcast off" selected. The video paging control menu 220 also shows how the menu can present a diagram or map of the school facilities identifying particular network devices that can be controlled by the menu selections. As with the teacher's user interface, the administrator menu displays function by transmitting commands associated with the virtual buttons via the local area network 30 to the central processor 10 which implements the desired command sequence. Also, similar to the teacher's user interfaces, access to administrator menu displays may be controlled via passwords which are managed by the central processor 10.

Presentation of UI control panels 210-214 in the various embodiments differ from the manner in which typical websites are presented to client browsers. In a typical website, each section of a page is a complete collection of elements, top to bottom. However, in order to reduce memory requirements so that network complements with limited memory capabilities can be used, the various embodiments implement the teacher's UI control panels 210-214 is a collection of plug-and-play modules, where each module serves a specific function. For instance, one module presents the menu across the top of all UI control panels 210-214. Another module presents a 10-digit keypad that may function as a keypad for the cable TV tuner or may be used to enter the initial password. As the teacher moves through the UI control panels 210-214, these plug-and-play modules are turned on and off, positioned within the user interface, and/or configured with unique text and/or functionality as appropriate to the particular UI control panel 210-214. For example, the top menu may show only a single HOME button until after the teacher enters a valid password. If the teacher accesses an "Advanced" menu page (e.g., via entry of a second password), the top menu may change again to show only those advanced menu options associated with the Advanced menu page, such menu options for performing hardware maintenance on the classroom control hub 16. Implementing user interfaces in this way enables the image and software files to be kept to minimal size while software resident on the teacher's PC 44 drives the presentation of information to the teacher. Further, various aspects of the client can be changed based on commands from the central processor or options that a teacher may turn on or off.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. An audio/video network system for use in a school, comprising:
   a central processor;
   an audio/video source configured to receive commands from the central processor;
   an audio/video encoder coupled to the audio/video source;
   a local area network coupled to the audio/video encoder and to the central processor;
   a classroom control hub coupled to the local area network;
   an audio/video device coupled to the classroom control hub;
   a computer coupled to the local area network; and
   a local device controller coupled to the classroom control hub and to the audio/video device, the local device controller configured to receive a signal from the classroom control hub and in response transmit a control to the audio/video device,
   wherein:
      the central processor and audio/video encoder are configured to send UDP message packets to the classroom control hub via the network using a bit-wise address;
      the classroom control hub is configured to receive message packets from the network and recognize message packets destined for the classroom control hub based upon a bit-wise address;
      the computer is configured with executable software to perform steps comprising:
         presenting a graphical user interface of audio/video device controls;
         receiving a user input via the graphical user interface;
         generating a command in response to the received user input; and
         transmitting the command on the local area network in a UDP message packet;
      the classroom control hub is further configured to receive the command from the computer and transmit the command to the central processor in a UDP message packet addressed with an IP address of the central processor; and
      the classroom control hub is further configured to execute the command at the classroom control hub if it is determined that the command can be executed by the classroom control hub by sending a signal to the local device controller.

2. The audio/video network system of claim 1, wherein the classroom control hub is further configured to transmit messages to the central processor in the form of UDP message packets addressed using an IP address of the central processor.

3. The audio/video network system of claim 1, wherein the classroom control hub is further configured to:
   determine whether the command can be executed by the classroom control hub;
   and transmit the command to the central processor in a UDP message packet addressed with an IP address of the central processor if it is determined that the command cannot be executed by the classroom control hub.

4. The audio/video network system of claim 1, wherein the classroom control hub is further configured to execute the command by sending a signal to the audio/video device.

5. The audio/video network system of claim 1, wherein the computer is further configured with executable software to implement the graphical user interface as a plurality of plug-and-play modules, wherein each module serves a specific function.

6. The audio/video network system of claim 1, wherein:
the audio/video encoder is configured to encode audio/video signals received from the audio/video source into UDP message packets including an Internet protocol (IP) address and port number; and
the classroom control hub is further configured to select from the local area network UDP message packets for decoding based upon their IP address and port number.

7. The audio/video network system of claim 6, wherein the central processor is further configured to send control message packets to the classroom control hub that identify an event as either audio or visual and identify the IP address and port number of UDP message packets from the audio/video encoder broadcasting the event.

8. A method for distributing audio/visual programming via a local area network, comprising:
encoding audio/video signals as UDP data message packets with an audio/video encoder, the UDP data message packets including an Internet protocol (IP) address and port number assigned to an audio/video signal source;
transmitting the UDP data message packets from the audio/video encoder on a local area network using a bit-wise address;
generating a control UDP message packet at a central processor, the control UDP message packet addressed using a bit-wise address and including the IP address and port number assigned to the audio/video signal source;
transmitting the control UDP message packet from the central processor to a classroom control hub on the local area network;
receiving the control UDP message packet at the classroom control hub and recognizing the control UDP message packet destined for the classroom control hub based upon the bit-wise address corresponding to the classroom control hub;
receiving and decoding the UDP data message packets using the IP address and port number obtained from the received control UDP message packet;
receiving a signal from the classroom control hub at a local device controller;
transmitting a control from the local device controller to an audio/video device in response to receiving the signal from the classroom control hub at the local device controller;
presenting a graphical user interface of audio/video device controls on a computer coupled to the local area network;
receiving a user input via the graphical user interface at the computer;
generating a command in response to the received user input at the computer;
transmitting the command from the computer to the classroom control hub on the local area network in a UDP message packet;
receiving the command at the classroom control hub and transmitting the command to the central processor in a UDP message packet addressed with an IP address of the central processor; and
executing the command at the classroom control hub if it is determined that the command can be executed by the classroom control hub by sending a signal to the local device controller.

9. An audio/video system, comprising:
means for encoding audio/video signals as UDP data message packets with an audio/video encoder, the UDP data message packets including an Internet protocol (IP) address and port number assigned to audio/video signal source;
means for transmitting the UDP message packets from the audio/video encoder on a local area network using a bit-wise address;
means for generating a control UDP message packet at a central processor, the control UDP message packet addressed using a bit-wise address and including the IP address and port number assigned to the audio/video signal source;
means for transmitting the control UDP message packet from the central processor to a classroom control hub on the local area network;
means for receiving the control UDP message packet at the classroom control hub and recognizing the control UDP message packet destined for the classroom control hub based upon the bit-wise address corresponding to the classroom control hub;
means for receiving and decoding the UDP data message packets using the IP address and port number obtained from the received control UDP message packet;
means for receiving a signal from the classroom control hub at a local device controller;
means for transmitting a control from the local device controller to an audio/video device in response to receiving the signal from the classroom control hub at the local device controller;
means for presenting a graphical user interface of audio/video device controls on a computer coupled to the local area network;
means for receiving a user input via the graphical user interface at the computer;
means for generating a command in response to the received user input at the computer;
means for transmitting the command from the computer to the classroom control hub on the local area network in a UDP message packet;
means for receiving the command at the classroom control hub and transmitting the command to the central processor in a UDP message packet addressed with an IP address of the central processor; and
means for executing the command at the classroom control hub if it is determined that the command can be executed by the classroom control hub by sending a signal to the local device controller.

* * * * *